United States Patent
Winkler et al.

(10) Patent No.: US 9,024,778 B2
(45) Date of Patent: May 5, 2015

(54) SYSTEMS AND METHODS FOR PROCESSING DRILLING DATA

(76) Inventors: Hugh Winkler, Dripping Springs, TX (US); Paul Teasdale, Queensbury, NY (US)

(*) Notice: Subject to any disclaimer, the term of this patent is extended or adjusted under 35 U.S.C. 154(b) by 296 days.

(21) Appl. No.: 13/606,965

(22) Filed: Sep. 7, 2012

(65) Prior Publication Data
US 2014/0070956 A1 Mar. 13, 2014

(51) Int. Cl.
*G08C 19/16* (2006.01)
*G08C 19/00* (2006.01)
*E21B 44/00* (2006.01)
*E21B 41/00* (2006.01)

(52) U.S. Cl.
CPC .............. *G08C 19/00* (2013.01); *E21B 44/00* (2013.01); *E21B 41/00* (2013.01)

(58) Field of Classification Search
CPC .......... E21B 47/12; E21B 47/00; E21B 44/00
USPC ................. 340/870.01, 853.2, 854.8; 175/40; 367/83, 84; 702/9
See application file for complete search history.

(56) References Cited

U.S. PATENT DOCUMENTS

| | | | | |
|---|---|---|---|---|
| 4,806,928 A | * | 2/1989 | Veneruso | 175/40 |
| 5,278,550 A | * | 1/1994 | Rhein-Knudsen et al. | 175/40 |
| 5,375,098 A | * | 12/1994 | Malone et al. | 367/83 |
| 5,402,068 A | * | 3/1995 | Meador et al. | 324/338 |
| 6,237,404 B1 | * | 5/2001 | Crary et al. | 175/40 |

* cited by examiner

*Primary Examiner* — John A Tweel, Jr.
(74) *Attorney, Agent, or Firm* — The Villhard Patent Group; Robert Villhard

(57) ABSTRACT

Systems and methods for processing drilling data. One embodiment provides a method comprising building user-designed contexts (which can be designated as built-in contexts) for drilling structures. The method also comprises orchestrating module execution within the user-designed contexts. The method further comprises providing data from the user-designed contexts to such modules via an interface. Some methods include monitoring drilling data to detect events (for instance departure from a pseudolog) and orchestrating module execution responsive thereto. The method can include exposing the orchestration of the execution of the module instances as a service. Moreover, some embodiments provide extra-contextual application program interfaces. In addition, or in the alternative, some embodiments schedule the orchestration of the modules based on declarations related to the inputs and/or outputs of the modules.

20 Claims, 11 Drawing Sheets

SYSTEMS AND METHODS FOR PROCESSING DRILLING DATA

BACKGROUND

Drilling rigs (for instance, those involved in hydrocarbon exploration and production) are acquiring increasing amounts of drilling data. Users of these drilling rigs and the companies interested in their operation typically use a combination of computer programs or processes and human intelligence to analyze the drilling data and combine it with previously recorded or stored historical data (and/or data from external databases) to control the drilling rigs; make decisions about current drilling activity; and/or to plan future exploration and production programs (that is, drilling programs).

The gathered drilling data includes, but is not limited to, surface-based measurements about the rigs' equipment (such as hook load, block height, rotary RPM etc.); measurement while drilling (MWD) operational data (including measurements such as down-hole torque, gamma ray, resistivity, etc.); borehole trajectory survey information; vessel positioning and cable tensioning data; mud logs; lithology reports; operational reports; and any other data having a bearing on the condition of the drilling rigs, wells, their operations, etc.

Lately, the advent of "wired pipe" is increasing the amount of data transmitted from down-hole locations. Moreover, because of the increasing availability of WANs (Wide Area Networks) such as the Internet, over which such data can be shared, users of such drilling data are finding ways to exploit the data with an expanding number of computer programs and each other. However, as disclosed herein, certain issues peculiar to drilling data (for instance data homogeneity and data heterogeneity) threaten to derail sharing of such data even as its availability soars. And, of course, the drilling data produced in these systems possesses some value and typically users want to preserve it and safeguard it from unauthorized tampering, spying, etc.

Traditional well-planning, drilling and geo-steering decision programs, wellbore stability analysis and prediction programs, and other programs related to exploration and production efforts also typically suffer from problems associated with single purpose programs. For instance, a user might realize a need or desire for a new program, write the code, deploy it to a processing platform, and begin its execution. In writing these programs, the user typically includes express designations in the code for the locations of their inputs, outputs, and other resources. Even when a similar new program is desired for deployment elsewhere, the writing of the new program includes again identifying, locating, and expressly designating the locations of the new inputs, the new outputs, and other resources which the new program is to use in its new environment.

Of course, sometimes desired functionality might suggest that the new program needs an input from another program. In such cases, the user must identify that other program and arrange some mechanism to ensure that this particular data is updated and available when needed. Sometimes, though, the user fails to provide that mechanism or the mechanism fails anyway. As a result, unpredictable operation of the new program occurs. These programs therefore often fail, "hang up," crash, etc. thereby frustrating their very purpose and, of course, interested users. In addition, because the users expressly coded the resource addresses needed for these programs, they cannot readily be re-used and are therefore effectively single-purpose programs. A need or desire for multiple versions of these single-purpose programs (e.g., a copy for each drilling rig in a company) aggravates the situation since each copy must be manually re-written despite similarities between the underlying subject matter (e.g., the drilling rigs).

Moreover, the needed data often originates at one point and is shared at some other point (or points). Typically, in such point-to-point data sharing schemes, the user must manually locate the logical, and sometimes even the physical, location of the source data and must manually identify the desired location for the processed results. Any mistake along the way can lead to unpredictable behavior of the programs depending on such resources. Moreover, deliberate attempts might be made to access or alter data for which the subject user has no access rights.

Discussing a more specific situation will illustrate other shortcomings of previously available single-purpose, point-to-point programming approaches. Take for instance, a previously available wellbore-stability system that connects over a network to a particular drilling rig's porosity measurements; computes the wellbore's condition; stores the results; displays real-time visualizations thereof; and issues an indication if the results indicate that an off-nominal condition might exist. To write such a program, each source of data involved in the stability calculation must be manually identified and each storage location, display location, etc. must also be manually identified. Furthermore, if any of that input data originates with other single-purpose programs, all of those single-purpose programs must be identified. Plus, mechanisms must be created to ensure that they execute before the new dependent program.

Similarly, a single-purpose geo-steering system can connect in a point-to-point manner with a source of a wellbore's current measured depth, azimuth, and inclination; calculate the wellbore's trajectory; store and display the results thereof; and issue an indication of the wellbore trajectory (whether nominal or off-nominal). Again, a user must manually and correctly identify the physical and logical source of the input data and of the targets for the various outputs. Moreover, the user must do so even when that data might not be stored (or otherwise available) where the user expects it to be and/or where the targets might have moved. In addition, the user must ensure the proper order of execution of all programs involved.

Many applications in the drilling domain follow a similar pattern. A user manually connects a hard-coded program which resides at one point to a point source of drilling data; manually confirms the data source(s); the routing of the outputs and the functioning of the program; and then leaves the new program running, hopefully with the right input data and right output locations updated and available at the correct times. In other words, the user configures the program in a point-to-point fashion and often incidentally constrains the program to a single purpose. While single-purpose and/or point-to-point configurations might be useful for a limited number of such situations, they become wasteful of the user's time after the setup of even a few such programs. In light of the hundreds (thousands, etc.) of possible programs to be performed on drilling data, point-to-point and/or single-purpose programs are too cumbersome and error-prone for practical or efficient use.

SUMMARY

The following presents a simplified summary in order to provide a basic understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed disclosure that is presented herein. The current disclosure provides systems, apparatus, methods, etc. for processing drilling related data. More particularly, systems of some embodiments enable users to avoid necessitating single-purpose and/or point-to-point configuration of data processing systems.

In some embodiments, the drilling data relates to drilling structures including mobile and stationary drilling rigs, mobile and stationary production platforms, fields, wells, wellbores, and/or various other structures often related to one or more companies. Thus, in some embodiments, a module operating within a built-in context can operate on one piece (or set) of drilling data to produce a second piece of drilling data. In some embodiments, a processing system is configured to monitor such drilling data for an event and to orchestrate the execution of the module(s) responsive to that event. In other situations, a module could compare a log to a pseudolog for departures from expected conditions in a wellbore. In yet other situations, the module could produce a rig-related (or other) condition responsive to the drilling data which it receives. In addition, or in the alternative, the processing system could expose, to a network, services such as orchestrating the execution of the modules. Some embodiments also provide extra-contextual application program interfaces (APIs) to allow access to drilling data outside of a module's current context. In addition, or in the alternative, some embodiments schedule the orchestration of the modules based on declarations related to the inputs and/or outputs of the modules. Moreover, the modules can be user designed as can the built-in contexts.

Another embodiment provides a method which comprises providing built-in contexts. The method also comprises orchestrating the execution of various user-designed modules residing within the built-in contexts. The built-in contexts, it is noted, can be user designed and can be enforced by a processing system. The method further comprises providing drilling data associated with one (or more) of the built-in contexts to the various user-designed modules and accepting drilling data from these user-designed modules via, for instance, a network or web-based interface. Methods of some embodiments also comprise monitoring the drilling data to detect events (for instance a rig condition change or a departure from a pseudolog) and orchestrating the execution of a user-designed module(s) responsive thereto. Furthermore, methods of some embodiments provide for exposing the orchestration of the execution of various modules within the built-in contexts as a service.

Another embodiment provides a system for processing drilling data. The system of the current embodiment includes a network interface and a processor in communication therewith which is configured to provide built-in contexts. Furthermore, processors of the current embodiment are configured to orchestrate the execution of modules within the built-in contexts. The processor can also be configured to provide drilling data associated with one of the built-in contexts to one of the modules and to accept a response from the module via the network interface.

Some embodiments create a context for each wellbore in a given well, field, etc. When a user-designed (or other) module executes in these contexts the processing system hands the module a reference to its context. In the current embodiment, the context is responsible for handling all queries and the context corresponds to exactly one wellbore. Thus, when the context receives a query for some drilling data (perhaps a log) it responds with drilling data (the logs) associated with that wellbore and no others. In some embodiments, the contexts correspond to other drilling structures such as fields. Accordingly, those contexts would respond to a query with drilling data related to all wellbores within the field. In some situations, metadata associated with the field(s) and wellbore(s) therein allow the processing system to identify all pertinent instances of a type of drilling data. Moreover, users can view graphic representations of such contexts on a user interface and the processing system will infer that user activities on the user interface should be associated with the currently displayed context and respond accordingly. This user interface could allow a user to build, modify, etc. contexts by dragging and dropping objects, modules, resources, etc. into the context. These contexts can then be built into various processing devices within the system as might be desired.

To the accomplishment of the foregoing and related ends, certain illustrative aspects are described herein in connection with the annexed figures. These aspects are indicative of various non-limiting ways in which the disclosed subject matter may be practiced, all of which are intended to be within the scope of the disclosed subject matter. Other advantages and novel features will become apparent from the following detailed disclosure when considered in conjunction with the figures and are also within the scope of the disclosure.

BRIEF DESCRIPTION OF THE FIGURES

The detailed description is described with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses systems, apparatus, methods, etc. for processing drilling data and, more particularly, for processing drilling data using user-designed contexts and drilling data processing modules.

Processing systems of some embodiments provide mechanisms which orchestrate the execution of user-designed (and other types of) modules. Consequently, designers of new modules can develop the modules independently of one another. Processing systems of the current embodiment can also connect these user-designed modules to their in-context (and extra-contextual) inputs and outputs even in the presence of certain peculiarities associated with drilling data.

In orchestrating the execution of the modules, processing systems of embodiments plan and coordinate the execution of the modules according to declarations of the modules which (as is further disclosed herein) relate to their associated contexts (whether built-in, user-designed, or both). For instance, should one module declare as an input the output of another module, processing systems of the current embodiment infer an in-context dependency between the modules. Accordingly, these processing systems schedule the execution of the modules in an order that provides that input after the data producing module updates the input. In other embodiments, all modules execute periodically and use corresponding input/output files to access various pieces of drilling data which might or might not be used by other modules. Upon awakening, each module checks to see of its input/output file has changed. If so, the module executes: if not, the module returns to a dormant state.

Thus, there is no need for a user to plan the execution of the modules; identify their dependencies; or otherwise ensure that they execute in some desired order. The user of a new or modified process can therefore configure it as a plug-in module with only its inputs and outputs, and other desired resources specified in its declarations or provided for in its input/output file. Processing systems of the current embodiment can therefore provide resources to these modules according to their declarations and/or the input/output files. As a result, instead of configuring a new wellbore stability process (for instance) in a single purpose and/or point-to-point fashion, the user merely configures the desired functionality and specifies the sought after resources while allowing the processing system to account for the context in which those resources will be found and the scheduling of the modules.

Figure 1:
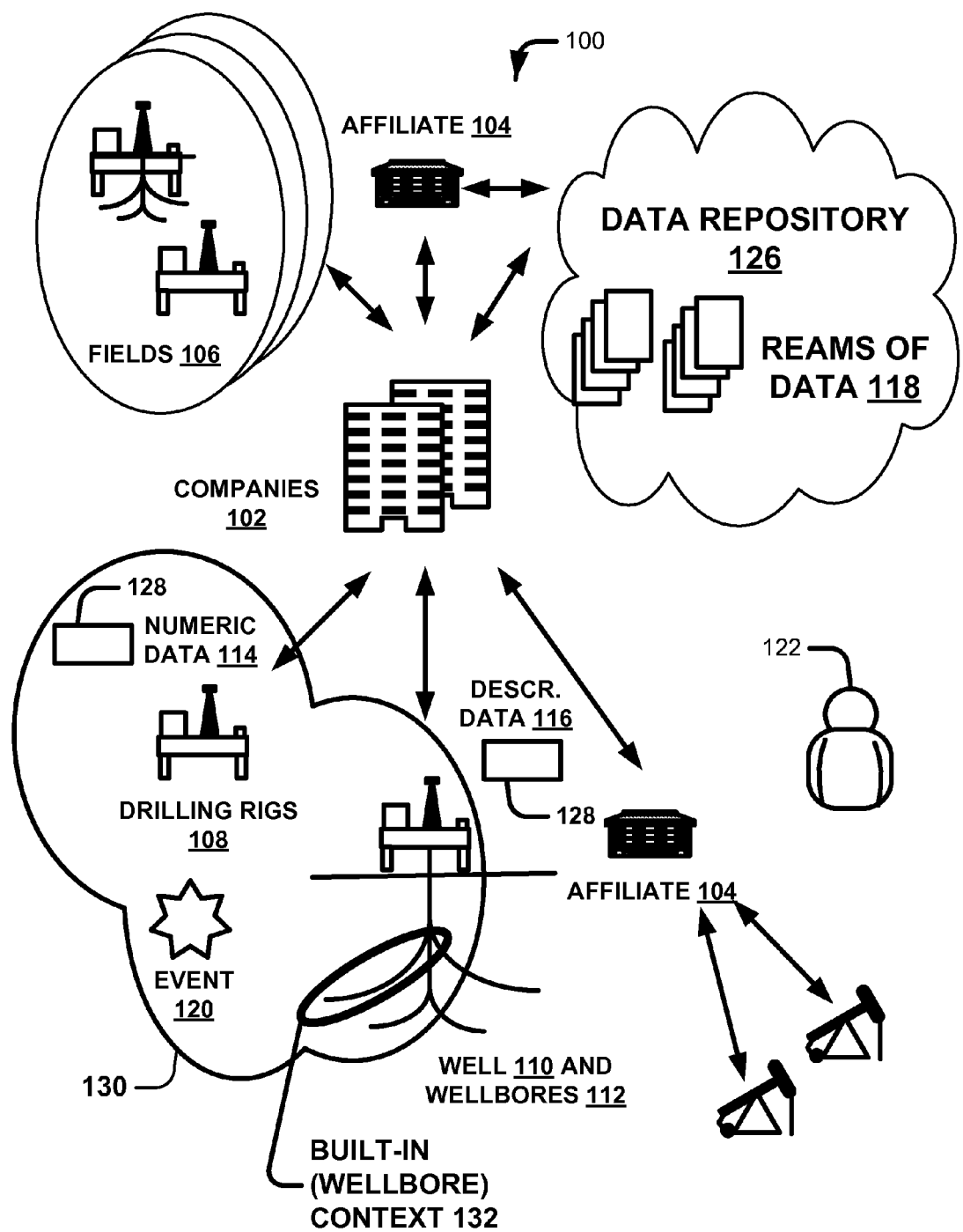
FIG. 1 illustrates a system for processing drilling data.

With reference now to the drawings, FIG. 1 illustrates a system for processing drilling data. More particularly, FIG. 1 illustrates system 100, companies 102, affiliates 104, fields 106, drilling rigs 108, wells 110, wellbores 112, numeric drilling data 114, descriptive drilling data 116, reams of data 118, event 120, user 122, data repository 126, indicator 128, user-designed context 130, and built-in context 132 among other aspects of system 100. As is disclosed herein, system 100 generates and processes drilling data (for instance numeric drilling data 114 and/or descriptive drilling data 116 as well as other types of drilling data) to provide information (perhaps including raw or processed drilling data 114 and 116) to user 122. It is noted here that the companies 102, affiliates 104, fields 106, drilling rigs 108, wells 110, and wellbores 112 comprise non-limiting drilling related hardware and/or structures of various sorts. Hereinafter, though, the term "drilling structure" and similar terms will be used to refer to such hardware and/or structures.

With continuing reference to FIG. 1, companies 102 and/or their affiliates 104 navigate various drilling rigs 108 to the fields 106 which are at least suspected of containing water, oil, natural gas, crude oil, or other fluid materials capable of being extracted by the drilling rigs 108. Thus, companies 102 can operate drilling rigs 108 in fields 106 which in turn may be spread throughout diverse locations. Moreover, while each drilling rig 108 can drill many wells 110 at various geographic locations, drilling technology allows some drilling rigs 108 to create multiple wellbores 112 in particular wells 110. These multiple wellbores 112 branch from the main well 110 and can often be drilled "horizontally."

Accordingly, organizational hierarchies exist which reflect various relationships between the companies 102 (hereinafter including the affiliates 104), the fields 106, the drilling rigs 108, the wells 110, and the wellbores 112. While the hierarchies do not limit the scope of the disclosure, they do illustrate some reasons why user-designed contexts 130 of embodiments allow users 122 who are authorized to build contexts desirable flexibility in processing drilling data 114 and 116 while preventing other users without such privileges from accessing drilling data 114 and/or 116 outside of their range of privileges. Indeed, as is disclosed further herein, user-designed contexts 130 can exist in system 100 as peers rather than in some hierarchical relationship. Some of these user-designed contexts 130 can be built into system 100 as built-in contexts 132 by context-building users 122.

Still with reference to FIG. 1, a company 102 often operates only some of the drilling rigs 108 in various fields 106. At another level, each of these drilling rigs 108 has one or more wells 110 which they have drilled or which are otherwise associated with those drilling rigs 108. As is apparent from FIG. 1, some wells have more than one wellbore 112. Moreover, it is even possible that one company 102 (a state, nation, etc.) might own mineral rights to drill in a particular field 106 and might license other companies 102 to drill therein. Thus, a particular field 106 might be subject to exploration and/or production (i.e., drilling) by various companies 102 and have various drilling structures located therein.

Moreover, as those skilled in the art will appreciate, drilling data 114 and 116 might come from, be stored at, or be requested by users 122 and processing systems at various locations (physical, logical, or otherwise) in, or relative to, the system 100. While global information system (GIS) technologies provide some functionality that helps users 122 keep track of various drilling structures in system 100, such GIS technology falls short of helping users 122 deal with data quality issues, ensuring that drilling data 114 and 116 is available and updated when needed, protected as desired, etc. For instance, a user 122 at the headquarters of a company 102 might be interested in an (physical, logical, etc.) event 120 that is occurring (or that has occurred) on a given drilling rig 108. However, given the mobility (and changeable ownership) of certain drilling structures, it might not be clear to that user 122 where in the system 100 (physically or logically) to find drilling data 114 and 116 pertinent to the event 120. Indeed, even when the ownership and location of the underlying drilling structure remains constant, locating and/or identifying the pertinent drilling data 114 and 116 can still pose challenges. For instance, the drilling data 114 and 116 could have been misfiled, misnamed, or otherwise lost or replaced by data not particularly pertinent to the event 120 of interest. Furthermore, while the foregoing discussion focused on events 120, it can be the case that a user 122 is interested in some piece(s) of drilling data 114 or 116 itself instead of some event 120 per se.

Further still, drilling data 114 and 116 might include a heterogeneous mixture of drilling data 114 and 116. More particularly, numeric drilling data 114 often includes voluminous time-indexed and/or depth-indexed data. Such numeric drilling data 114, while enabling real-time (and/or hindsight) insight to events 120, can be difficult to access or appreciate since the system 100 sometimes produces much of it at rapid rates (with updates occurring within minutes, seconds, milliseconds, etc.). That is, some numeric drilling data 114 might be real-time, dense data while other drilling data can be merely descriptive. The latter are often enumerated or user entered. For instance, the name and configuration of a drilling rig 108 in system 100 might be user entered or might be enumerated from a known list of possibilities. Moreover, descriptive drilling data 116 could be entered in a textual format for yet another non-limiting example.

On that note, descriptive drilling data 116 might be relatively static in that it will not normally change much over time and/or can be accessed at a pace desired by the user 122 or system 100. This aspect is usually true of recorded or stored descriptive drilling data 116. Moreover, some descriptive drilling data 116 might not necessarily be "dense." For instance, the overall condition of a drilling rig 108 (a "rig condition") usually remains the same over relatively long periods of time and therefore comparatively few data points (along with perhaps time stamping) might be sufficient to indicate a drilling rig's top-level condition for minutes, hours, days, or longer. Furthermore, these two non-limiting types of drilling data 114 and 116 might interact to reflect events 120 and other information useful to the user 122. To aid in processing such heterogeneous data, systems 100 of some embodiments can associate metadata (indicators 128 or otherwise) with each set (or even point) of drilling data 114 and 116 to indicate whether it is numeric or descriptive and also reflect whether that drilling data 114 or 116 is real-time, dense, time-indexed, depth-indexed, historic, stored, recorded, static, or have some other mixture of characteristics. Moreover, that metadata can identify which drilling structure (for instance a particular wellbore 112) which the drilling data 114 or 116 is associated with. As is disclosed further herein, system 100 can use the indicator to associate the corresponding drilling data 114 and 116 with built-in and user-designed contexts 130 and 132 respectively.

In addition, inconsistencies in (and errors associated with) drilling data 114 and 116 (for instance, the use of differing measurement units, data drop outs, storage formats, etc.) complicate deriving meaningful information for the users 122 and the various automated or semi-automated processes in or associated with system 100. Thus, the indicator(s) 128 can be associated with various pieces of drilling data 114 and 116 to provide information related to the foregoing types of issues (as well as others) so that system 100 can accommodate various types of drilling data 114 and 116 which it will likely encounter. Moreover, with systems heretofore available, even if the users 122 arranged for all of this drilling data 114 and 116 to be collected into the data repository 126, many of the effects of the foregoing (and other) problems would persist within the drilling data 114 and 116 stored therein. Thus, processing drilling data 114 and 116 has proved difficult for users 122 limited by systems heretofore available. Indeed, the available reams of data 118 and/or the difficulties in identifying, locating, processing etc. drilling data 114 and 116 can obscure events 120 as viewed by user 122.

According to embodiments, a user 122 can account for these data quality issues (among many others too numerous for enumeration herein) and issues related to orchestrating the execution of various processes by employing built-in contexts 132 and/or user-designed processing modules (and contexts). Regarding the orchestration of process execution, some embodiments differ from "sandbox" architectures in that the context builders create their own sandboxes. Moreover, they do so free of system imposed a priori sandbox-related restrictions if they so desire. Having discussed aspects of system 100, it might now be useful to consider a particular drilling structure, such as a drilling rig 108, in greater detail. More particularly, it might be useful to discuss some aspects of the use of built-in contexts 132 in processing drilling data 114 and 116.

Figure 2:
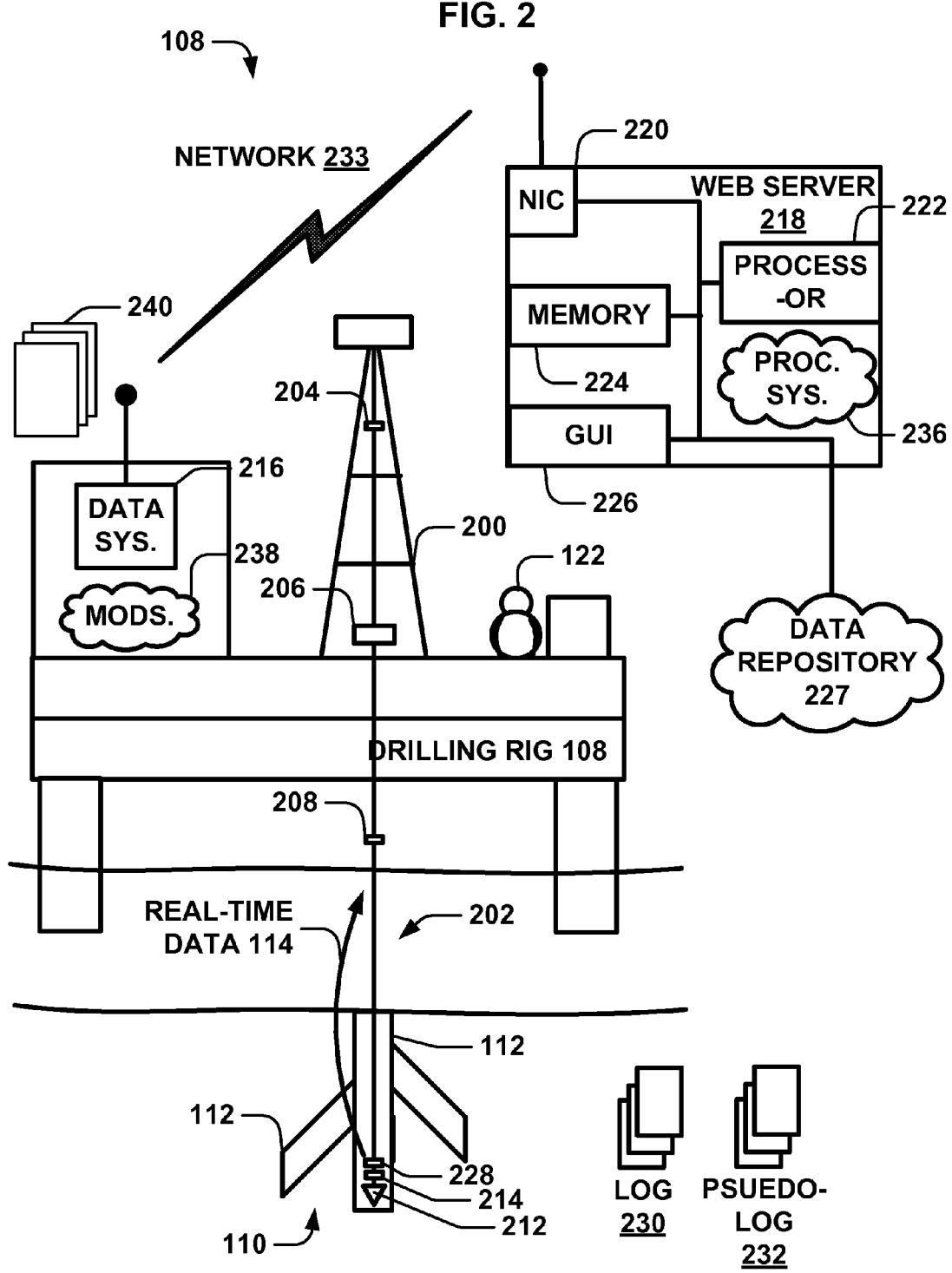
FIG. 2 illustrates a drilling rig.

Thus, FIG. 2 illustrates a drilling rig. As shown, the drilling rig 108 includes mast or derrick 200, drill string 202, hook 204, rotary table 206, connection 208, drill bit 212, and mud motor 214 among many other potential components. In addition, FIG. 2 illustrates that the drilling rig 108 can include a computer or data system 216 networked with a web server 218 which further comprises network interface 220, processor 222, memory 224, and user interface 226. FIG. 2 illustrates that either, or both of, the data system 216 of the drilling rig 108 and the web server 218 can be in communication with a Wellsite Information Transfer Specification Markup Language (WITSML) or other type of data repository 227. This particular drilling rig 108 also includes (or uses) an instrument package 228, a log 230, and a pseudolog 232.

Typically, users 122 on the drilling rig 108 use the derrick 200 and hook 204 to suspend the drill string 202 while drilling various wellbores 112. They do so by repeatedly making connections 208 between pieces of drill pipe (and/or other down-hole components) to form the drill string 202 and drilling further to hopefully discover and/or extract fluid materials from a reservoir. In addition, users 122 operate the rotary table 206 to drive the drill bit 212. In the alternative, or in addition, users 122 sometimes drill horizontally using the mud motor 214 to drive the drill bit 212. Colloquially, the former operation is known as "drilling" while the latter operation is known as "sliding." Of course, at other times, the users 122 can "trip" (that is, hoist) the drill string 202 from the wellbore 112 as might be desired to install different components on the drill string 202. Thus, various drilling operations create loads on the hook 204, rotary table 206, etc. While, the foregoing discussion only touches on a few of the types of operations occurring on the drilling rig 108, it will be appreciated by those skilled in the art that many types of operations occur on the drilling rig 108.

It will also be appreciated by those skilled in the art that the drilling rig 108 can typically create one or more wellbores 112 in any given well 110. Doing so entails creating an initial wellbore 112 and perhaps even completing that first wellbore 112. Often the first wellbore 112 happens to be a mostly vertical wellbore 112 which proceeds from the initial drilling point approximately straight down through various formations sometimes until the reservoir is contacted. In such cases, the length of the drill string 202 happens to correspond to the actual depth of the well 110 (i.e., the "true measured depth"). However, wellbores 112 with horizontal or sloped sections typically branch out from the initial wellbore 112 in various directions to reach other portions of the reservoir or even other reservoirs.

As drilling proceeds, the drill bit 212 cuts through various geologic formations to form the wellbores 112. Note that, in the case of a horizontal wellbore 112, the length of the drill string 202 can depart drastically from the actual vertical depth of the wellbore 112 because of the horizontal displacement of the drill bit 212 from the initial wellbore 112. The length of the drill string 202 in these cases is sometimes equated with the "bit depth" or "measured depth." It might also be worth noting that while the foregoing discussion involves a particular order for creating the wellbores 112, no particular order limits the disclosure.

Moreover, users 122 often include an instrument package 228 on the drill string 202 (on the wireline, placed down-hole, etc.) to measure aspects of the geologic formations through which the drill bit 212 passes and/or other conditions. Instrument packages 228 typically measure the gamma radiation, resistivity, density, porosity, etc. in the vicinity of the drill bits 212 (or the down-hole portions of the drill string 202). In addition, surface portions of drilling rig 108 also produce numeric drilling data 114 including, but not limited to, the hook load and the torque being experienced by the hook 204 and rotary table 206 (or the drill string 202). All of the foregoing types of drilling data can be real-time, dense, time-series and/or numeric drilling data 114. Of course, the drilling rig 108 also typically generates or has associated therewith descriptive drilling data 116 that often happens to be relatively static. Another example, would be a mudlog which once recorded for a wellbore, or portion thereof, does not change and therefore is static absent some unusual circumstance where it changes after having been stored (for instance, an error therein is corrected or a misfiled mudlog is re-filed correctly). Furthermore, some types of drilling data 114 and 116 have already been stored or recorded in system 100 and are thus "static" or historical.

With continuing reference to FIG. 2, the instrument package 228 communicates with the data system 216 of the drilling rig 108 via "wired pipe" or some other communication protocol. In addition, the data system 216 communicates with the web server 218 via the network 233. The network 233 can be any type of network including a WAN (wide area network), LAN (local area network), hard wired (e.g., Ethernet), wireless, infrared, satellite-based, etc. type of network. Thus, drilling data 114 and 116 arising on the drilling rig 108 can be shared with the web server 218, other computers, the data repository 227, etc. and even systems other than system 100. Moreover, drilling data 114 and 116 can be shared among the various apparatus, programs, users 122, etc. on the drilling rig 108, elsewhere in the system 100, or anywhere in communication with the system 100 (see FIG. 1). Because drilling data 114 and 116 arise from many drilling structures but certain users 122 might only be allowed access (read, write, or read/write) to subsets of drilling data 114 and 116 system 100 of some embodiments provides built-in contexts to, in part, provide data security in some situations.

Still with reference to FIG. 2, a processing system 236 can reside on the web server 218 while one or more user-designed modules 238 can reside in the data system 216 on the drilling rig 108 (along with their input/output files 240 of some embodiments) of the current embodiment. Of course, the web server 218 can be located at a headquarters of a company 102, or elsewhere in the system 100 (see FIG. 1). For instance, the web server 218 (with the processing system 236) could reside on the drilling rig 108 in data system 216. Likewise, the user-designed modules 238 can reside in various locations within the system 100 (for instance, in web server 218, at company 102 headquarters, or in the data systems 216 on the drilling rigs 108). However, typically, the user-designed modules 238 reside on, or near, various drilling structures while the web server 218 and processing system 236 typically reside at some convenient, centralized (at least organizationally) location. As those skilled in the art will appreciate, the web server 218 includes certain functionality supporting the processing system 236. For instance, the network interface 220 of the web server 218 allows communications with the data system 216 of the drilling rig 108, while the processor 222 executes the processing system 236. Data system 216 includes similar supporting functionality for user-designed modules 238 and other types of processes.

Drilling data 114 and 116 can be stored temporarily or permanently in the memory 224 of the web server 218 although it can be stored elsewhere. For instance, the drilling data 114 and 116 can be stored in various formats (for instance, WITS Markup Language (WITSML) format, Log ASCII Standard (LAS) format, spreadsheets, etc.) in the data repository 227 or in the input/output files 240 in data system 216 among other locations. Moreover, because the various components of the web server 218 communicate with each other and the user interface 226, users 122 can access raw drilling data 114 and 116 as well as the results produced by the user-designed modules 238, the data system 216, and/or the processing system 236.

Furthermore, in some embodiments, the processing system 236 exposes for use certain services which it provides to the user-designed modules 238 and other processes (within or external to system 100) via the network 233. As may be appropriate, such communications can be by way of any transmission protocol such as the Wellsite Information Transfer Specification (WITS), Open Connectivity (OPC), OPC Unified Architecture (OPC-UA), etc. and other applicable protocols, associated application program interfaces (APIs), etc.

Some of the drilling data 114 and 116 created by the drilling rig 108 reflects profiles of the wellbores 112. Users 122 sometimes refer to these profiles as logs 230 and the underlying drilling data 114 and 116 as log data. In many situations, the users 122 can predict with some accuracy what the profile of the wellbore 112 ought to be. These predictions can take the form of a pseudolog 232 which details depth-correlated predictions of what measured conditions in the wellbore 112 ought to be. Since both the log 230 and the pseudolog 232 correlate wellbore properties and depth, a comparison of the log 230 and the pseudolog 232 for a wellbore 112 can reveal unexpected conditions. For instance, if one of the properties on the log 230 departs from its corresponding predicted value in the pseudolog 232, the users 122 can take remedial action assuming, of course, that the data issues discussed herein do not obscure the deviation. Moreover, certain user-designed modules 238 can maintain the logs 230, compare them to the pseudologs 232, and issue indications should they detect deviations from the pseudologs 232.

No matter the type of operation occurring on the drilling rig 108 (or other drilling structure for that matter), these operations produce drilling data which might arise as numeric drilling data 114 and/or descriptive drilling data 116. Again, the drilling data 114 and 116 can exhibit both homogeneity and heterogeneity. Both issues and the otherwise varying characteristics of drilling data 114 and 116 give rise to complications in processing drilling data 114 and 116. In addition, data security concepts suggest that some users 122 be given limited access rights to some drilling data 114 and 116 while other users receive greater or different access rights to the same. Having therefore discussed some aspects of the system 100, the drilling rigs 108, the wells 110 the wellbores 112, and drilling data 114 and 116, it might now be useful to address (with reference to FIG. 3) some aspects of an organizational framework 300 sometimes associated with the system 100.

Figure 3:
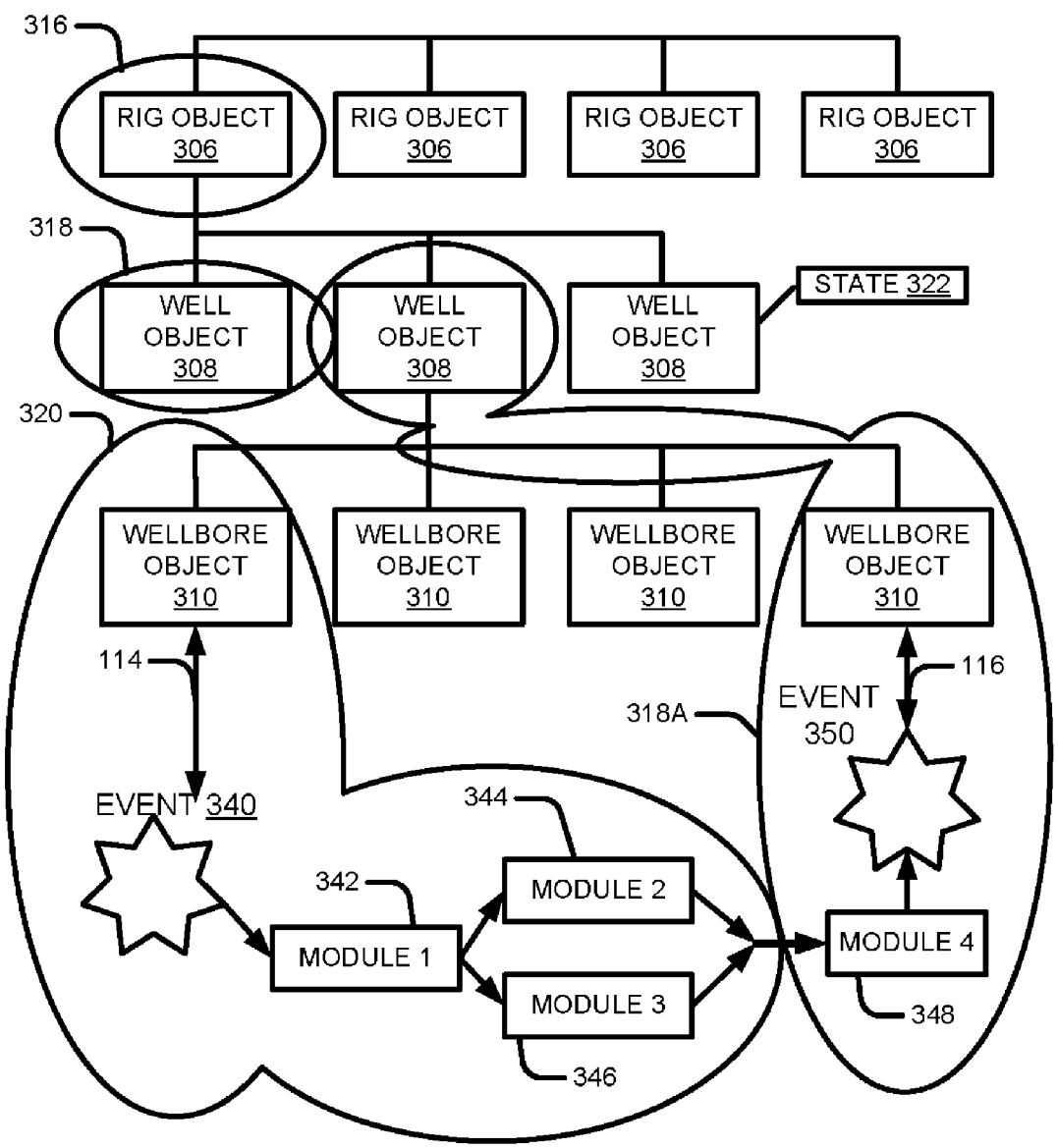
FIG. 3 illustrates an organizational framework for processing drilling data.

FIG. 3 illustrates an organizational framework for processing drilling data. While systems heretofore available might use such frameworks 300 to organize the processing of drilling data 114 and 116 many embodiments of the current disclosure do not. Indeed, various embodiments free context building users 122 from restrictions associated with such frameworks 300 by allowing these users 122 to build their own contexts independently of framework 300 provided that they have context-building permissions or access rights to system 100. Nonetheless, it might be informative (by way of comparison between such framework-based approaches and various embodiments) to discuss some aspects of framework 300. Thus, FIG. 3 illustrates framework 300, rig objects 306 and/or (production platform objects or the like), well objects 308, wellbore objects 310, rig context 316, and well context 318, and built-in contexts 320. Framework 300 could also include contexts, objects, etc. associated with (oil) fields and companies which encompass some or all of the drilling rigs 108, wells, 110, wellbores 112, etc. In addition, wellbore-based context, objects, etc. could be included in framework 300. As will be disclosed further herein, FIG. 3 also illustrates an event 340 (which might be either physical or logical), several modules 342, 344, 346, and 348, and another event 350.

The various contexts (and objects) in framework 300 can serve as logical constructs for associating information with the corresponding drilling structures of system 100 (see FIG. 1). For instance, the wellbore objects 310 correspond to particular wellbores 112 and allow the processing system 236 (see FIG. 2) to associate drilling data 114 and 116 associated with the particular wellbores 112 with particular wellbore objects 310. Moreover, the various objects can be either sources of, or destinations for, drilling data 114 and 116. The built-in contexts 320 (or rather, in some embodiments, the corresponding wellbore objects 310) allow the processing system 236 to associate events 340 and user-designed modules 238 (for instance, module 342) with the corresponding wellbore 112 as desired by context-building user 122. Other built-in contexts 320 (or objects) serve similar functions for drilling structures in systems 100 of differing types. Thus, built-in contexts 320 can free users 122 with context-building permission from restrictions implied by such organizational frameworks 300 while imposing on users 122 without context building permissions data security policies associated with system 100.

With continuing reference to FIG. 3, in real world systems 100, relationships between drilling structures are not simple or even static. Indeed, while one-to-one relationships exist, many-to-one, one-to-many, etc. relationships might exist and might also merge, disassociate, and otherwise change. Additionally, due to data-related issues such as data heterogeneity and/or data homogeneity, particular pieces of drilling data 114 and 116 might be associated with more than one drilling structure and might (correctly or not) appear to be associated with other drilling structures. Furthermore, it might be the case that a user discovers interrelationships between various drilling structures and/or objects (and the apparently associated drilling data 114 and 116) that are not practicable to predict before the fact. Embodiments which allow users 122 to build contexts allow these users 122 to avoid the restrictions of sandbox-like programming environments while being able to rely on sandbox-like enforcement and/or data security mechanisms provided by processing system 236 to restrict access to drilling data 114 and 116 by users 122 without such permission.

That being said, objects 306, 308, and 310 and their associated resources can be thought of as residing within the corresponding user-designed contexts 320. As is disclosed further herein, context-building users 122 can designate which objects, user-designed modules 238 (see FIG. 2), and other resources reside in or are associated with a context the context-building user 122 desires to build. Instances of user-designed modules 342, 344, and 346 are thus illustrated as residing within a particular built-in context 320 roughly corresponding to some particular wellbore 112. Indeed, that wellbore context could have been defined by a context-building user 122 by selecting the objects, user-designed modules 238, drilling data 114 and 116, etc. to associate there with. While FIG. 3 illustrates built-in context 320 incorporating one and only one wellbore object 308 (which in many embodiments might be the typical or default built-in context 320 provided by system 100), however, no such restriction exists on the manner in which a system 100 could provide a context. For instance, some built-in contexts 320 can incorporate more than one object, overlap other contexts, and only partially incorporate some objects. Thus processing system 236 allows context-building users 122 to violate some typical programming guidelines (for instance, treating objects as whole entities) if so desired. In the case illustrated by FIG. 3, context-building user 122 has associated a wellbore object 310, event 340, and user-designed modules 342, 344, and 346 with built-in context 320. It is noted here that since these user-designed modules 342, 344, and 346 can be instantiated for other contexts (whether built-in or not), these user-designed modules can be re-used without modification. Meaning that these user-designed modules 342, 344, and 346 can have multiple purposes as opposed to being single-purpose processes.

Moreover, event 350 and user-designed module 348 are illustrated as having been associated with user-designed context (here a user-designed well context 318A) roughly corresponding to the well 110 of which the particular wellbore 112 is a part although only one of the wellbore objects 310 is shown within that well context 318A. But as noted, the relationships between the objects, user-designed contexts, etc. arising from user selections might or might not reflect hierarchical, organizational, etc. relationships in framework 300 and/or system 100 between various drilling structures (potentially including structures outside of system 100).

Thus, as will be appreciated by those skilled in the art, and depending on the nature of the event 340, it might be the case that that event 340 affects not only the wellbore 112 (or other particular structure) with which it happens to be most closely associated but also with other wellbores 112 in the well 110. Furthermore, because these wellbores 112 are in the same well 110, it is possible that either or both of the events 340 and 350 might affect the well 110 containing these wellbores 112. Furthermore, the association of the events 340 and/or 350 could flow to all of the other wellbores 112 of that well 110 and all (or part) of the way to a particular company(s) 102 depending on circumstances. Thus, the events 340 and 350 could be associated with various combinations of the corresponding built-in contexts 320.

For instance, event 340 might be a single physical event that occurred in one wellbore 112 and that might affect more than one context such as a gamma ray measurement exceeding 300 API. A gamma ray monitoring module in that context might fire a "gamma ray out of bounds event" to all listeners in that context. In addition, a module in another wellbore context might have been set up to monitor all gamma ray readings in the corresponding well or even field. A different instance of the gamma ray monitoring module in the second context would similarly fire a logical "gamma ray out of bounds" event. Thus, the single physical event 340 might cause two logical events 350 to fire in response thereto.

Moreover, because of circumstances not practicable to foresee, associations such as the foregoing might only occur to a user 122 after consideration or even through happenstance. Thus, embodiments allow users 122 to define their own built-in contexts 320 to reflect associations which they select.

Furthermore, each built-in context 320 (whether user-designed, hierarchical, or otherwise) of some embodiments has associated therewith certain other types of information. Context-building users 122 can define these associations as desired with, or without, regard to frameworks 300 or other relationships between drilling structures.

Moreover, users 122 sometimes want to perform certain processes on the drilling data 114 and 116. Indeed, it is difficult to foresee the variety in which these processes or their locations (physical or logical) in system 100 might come. System 100 of various embodiments therefore allows context-building users 122 to design contexts tailored to enable, handle, and/or otherwise facilitate the functioning of user-designed modules 238 encapsulating such processes. It is noted here that since a module does not (ordinarily) access drilling data outside of the context in which it operates, user-designed modules 238 can be authored by users 122 with or without context building authority.

In various embodiments, system 100 allows these processes to be encoded, encapsulated, or otherwise contained within user-designed modules 238 such as user-designed modules 342, 344, 346, and 348. The ability to design user-designed modules 238 and/or built-in contexts 320 allow non context-building users 122 to set their own rules for processing drilling data 114 and 116 while relying on processing system 236 to enforce those rules via context-based security mechanisms. Processing system 236 also operatively connects user-designed modules 238 with the drilling data 114 and 116 and other resources declared by the user-designed modules 238.

Likewise, processing system 236 of various embodiments accepts, handles, or otherwise receives the responses of the user-designed modules 238 as desired by the user 122. To do so, the processing system 236 of some embodiments associates a user declared context (for instance, built-in context 320) with each user-designed module 238 and even other modules, programs, processes, etc.

The actual context associated with each user-designed module 238 depends on circumstances but is usually selected by its author. But, if desired processing system 236 can derive a default context from the logical location in which a user-designed module 238 (or rather an instance thereof) or other type of process resides or appears to originate. Thus, should a user-designed module 238 arise from the data system 216 of a given drilling rig 108 (see FIG. 2), processing system 236 associates a default rig context 316 corresponding to that drilling rig 108 with that user-designed module 238 unless otherwise designed by user 122. Thereafter, processing system 236 connects drilling data 114 and 116 and other resources from that same rig context 316 to that user-designed module 238 unless otherwise indicated. In this manner, should a user-designed module 238 in a particular context request a resource, it receives a resource or an instance of a resource (for instance, drilling data 114) associated with the drilling structure corresponding to its default context. Context-building user 122, though, can override the default context by designating another context or creating a built-in context 320 as they desire. User-designed module 238 and/or user-designed context 320 authors therefore can be free to define their own rules via the manner in which they design their built-in contexts 320 and user-designed modules 238 within the constraints of their access privileges.

It is noted that various processes might not have been designed to operate with built-in contexts 320 or other aspects of processing system 236. Thus, processing system 236 of the current embodiment can attempt to associate a context with each process which tries to access system 100 whether it executes within system 100 or elsewhere. Each time such a legacy (or other) process seeks to access a resource within system 100, processing system 236 can determine with which drilling structure the legacy process appears to be associated and assigns that process the corresponding context. If no particular context appears to be appropriate, processing system 236 can return a query to the process requesting more specificity in its access request and can issue a prompt to define a context if the process (or user) so desires and has the appropriate privileges. Thus, system 100 allows legacy processes to interact with the drilling structures, associated objects, contexts, and drilling data 114 and 116 of system 100. For instance, if some event causes a legacy process to execute, the identity of the event 120, metadata associated therewith, or the logical point of origin of the event 120 within framework 300 or system 100 can be used to determine a probable context of that invoked legacy process if the legacy process identifies the event 120 (or other system 100 related trigger) in its access request.

User-designed modules 238 whether or not designed to use framework 300, though, can be designed to declare what their context should be (at least for the desired purposes of that user-designed module 238). Thus, processing system 236 associates a context with most if not all instances of the user-designed modules 238 and/or legacy processes. When a user-designed module 238 needs drilling data 114 or 116 (or provides such resources), processing system 236 connects the user-designed module 238 to the appropriate source or destination within the context in which the requesting user-designed module 238 resides. Furthermore, should a user-designed module 238 attempt to modify a resource outside of its context, processing system 236 can regulate such conduct (thereby enforcing the context for the user-designed module 238 and preventing data access outside of the scope of that context).

In some embodiments, though, user-designed modules 238 can expressly declare that some desired sources or destinations of drilling data 114 and 116 are those associated with some other context thereby evading context-based data access protections otherwise provided by processing system 236. And, indeed, processing system 236 of some embodiments provides extra-contextual application program interfaces (APIs) to handle such situations. Note that processing system 236 can also handle in-context drilling data 114 and 116 via in-context APIs or by other mechanisms. Thus, processing system 236 generally follows the declared specifications to the specified in-context source/destination while allowing module authors further flexibility in processing drilling data 114 and 116 via these extra-contextual APIs. Having discussed aspects of frameworks 300, built-in contexts 320, and user-designed modules 238 together, it might now be useful to further discuss aspects of user-designed modules 238 themselves in greater detail.

Thus, FIG. 3 provides an illustrative set of user-designed modules 342, 344, 346, and 348 and events 340 and 350. Beginning with module 342, FIG. 3 shows that module 342 was associated with a particular built-in context 320, wellbore object 310, and wellbore 112 by context-building user 122. Thus, ordinarily, processing system 236 will provide instances of user-designed module 342 with resources from within that wellbore context 320. In some situations it might be the case that processing system 236 provides resources to user-designed module 342 from another related context such as a related rig context 316, or well context 318 or even other sources via an appropriate extra-contextual API. For instance, certain pieces of drilling data 114 and 116 pertinent to the current wellbore 112 (or issue(s) which user 122 designed user-designed module 320 to deal with) might be found in the selected well, rig, field, or company context respectively. In such situations, as declared by user 122 in the user designed modules 238, processing system 236 employs the built-in context 320 that user-designed module 238 to align in-context resources with that user-designed module 238. Moreover, user-designed module 238 could even declare data external to its user designed context and/or framework 300 via an appropriate extra-contextual API call.

In the case shown in FIG. 3, module 342 happens to monitor drilling data 114 and/or 116 from built-in context 320 to determine whether event 340 might have occurred or is occurring. Events, in such situations, could be a periodic scheduled firing, a threshold detected event emitted by some other module, or some other programmatic event generated by the processing system or by another module in the same context. It might be worth noting that event 340 could be difficult to discern by a user 122 located far (either physically or logically) from the corresponding wellbore 112 (see FIG. 1). As illustrated, though, user-designed module 342 can detect and/or begin handling event 340 as designed by user 122. Furthermore, depending on its functionality, user-designed module 342 might or might not be sufficient to fully handle the event 340. Indeed, user-designed module 342 could be designed to merely detect the event 340 and output an indication that the event 340 occurred (that indication, perhaps, being an event itself that user-designed module 342 fired). In which case, processing system 236 would receive that indication from user-designed module 342 and forward it to user-designed modules 344 and 346 (if their declarations specify that output of user-designed module 342 as an input). Thus, the arrows between the events 340 and 350 and the user-designed modules 342, 344, 346, and 348 indicate that processing system 236 handles the transfer of drilling data 114 and/or 116 there between.

Accordingly, processing system 236 could watch for changes in the output of user-designed module 342 so that, when event 340 occurs, processing system 236 becomes aware of the same. Processing system 236 could then orchestrate the execution of user-designed modules 344, 346, and 348 (based on inferences drawn from their declared inputs and outputs) which, in the current scenario, further handle event 340. Note that some of these user-designed modules 342, 344, 346, and 348 might depend on one another. That is, some user-designed modules 344, 346, and 348 can declare as inputs, outputs provided by other user-designed modules 238 (or other types of processes if desired). Processing system 236 examines those input declarations; locates the corresponding outputs (as provided by corresponding modules); and arranges for the execution of the input-producing user-designed modules 238 before execution of the input-requiring user-designed modules 238.

Of course, processing system 236 could perform such analyses in reverse. That is, processing system 236 could examine the output declarations; determine which inputs correspond thereto; and schedule execution of the corresponding user-designed modules 238 accordingly. Processing system 236 can therefore schedule and orchestrate execution of the various user-designed modules 342, 344, 346, and 348 in an order that provides the desired functionality in a predictable, reliable, and user friendly fashion. No matter how processing system 236 arrives at a particular schedule, processing system 236 (in orchestrating execution of various user-designed modules 238) can send corresponding data systems 216 (on the drilling structures or elsewhere) notifications of when that schedule indicates that various user-designed modules 238 (and other processes) can begin.

FIG. 3 also illustrates that user-designed module 348 can cause another event 350 to occur. For instance, suppose that event 340 is the completion of a new wellbore 112. In this case, completion of the new wellbore 112 could return the associated well 110 to service or at least remove some operational restrictions associated therewith. In that case, many users 122 could be interested in that information. In addition, as soon as well 110 returns to service the extraction of materials there from, and from the other wellbores 112 therein, could resume. As such, the occurrence of event 350 could serve to notify many users 122 of such a change. Other user-designed modules 238 could begin executing, or resume executing upon the occurrence of event 350 if they are registered to listen for events of the type associated with event 350.

It might be worth noting that module authoring users 122 can register modules with processing system 236 to listen for event types. When such an event occurs, processing system calls the module's event handler for events of that type and in so doing passes an instance of that event to the module. Moreover, user-designed module 348 could be associated with some context other than the built-in context 320 which the initial event 340 occurred as specified by the user 122. FIG. 3 therefore illustrates user-designed module 348 and event 350 as having been so associated with user-designed context 318A which, in the embodiments of FIG. 3, happens to be superior (in the optional framework 300) to a default wellbore context. Note that the term "superior" here connotes that one context contains another context and does not otherwise limit built-in contexts 320 built-in contexts 320 and 318A. Adherence to or use of a hierarchy or framework 300 is therefore not required for the practice of many embodiments but can be used if desired.

Figure 4:
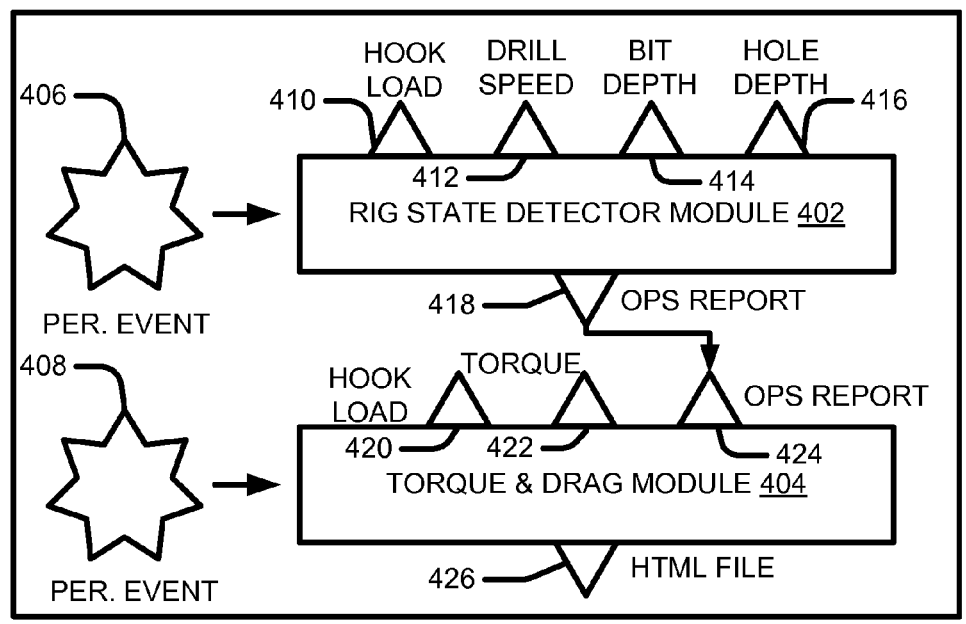
FIG. 4 illustrates aspects of two drilling data processing modules.

FIG. 4 further illustrates aspects of two drilling data processing modules. More particularly, FIG. 4 illustrates two particular user-designed modules 402 and 404, two periodic events 406 and 408, and a number of connectors 410, 412, 414, 416, 418, 420, 422, 424, and 426 of the modules 402 and 404. While modules 402 and 404 of the current embodiment execute in data system 216 (see FIG. 2) of a particular drilling rig 108, user-designed modules 402 and 404 communicate with processing system 236 in web server 218 (which can be remote there from) for at least some input/output activity associated with drilling data 114 and 116. The illustrative user-designed modules 402 and 404 happen to have been designed for, respectively, detecting the condition of a drilling rig 108 and for determining the torque and drag being experienced by the drilling string 202 of any drilling rig 108. Thus, since processing system 236 can connect the user-designed modules to appropriate inputs (no matter their origin on different drilling rigs 108 or other drilling structures) processing system 236 supports portability and interoperability of modules 238.

In the current embodiment, torque and drag user-designed module 404 depends on rig state user-designed module 402 for an operations report (or, rather, certain drilling data 114 and 116 therein). That is, rather than relying on a user 122 to 1) identify all of the point-to-point configurations necessary to create and forward the operations report and 2) order the execution of processes corresponding to user-designed modules 238, processing system 236 relieves users 122 of these burdens at least in part.

At run time, the rig state user-designed module 402 (with the aid of the processing system 236) thus first creates the operations report via its connectors 410, 412, 414, and 416 and outputs it (to system 100) via its output connector 418. Processing system 236 then forwards the operations report to torque and drag user-designed module 404 in accordance with its input connector 414. Thus, as long as an in-context operations report is available from somewhere, for instance an instantiation of torque and drag user-designed module 404, rig state user-designed module 402 can be modified or disappear without impacting torque and drag user-designed module 404. Processing system 236 can therefore support independent development and maintenance of user-designed modules 238.

Moreover, both user-designed modules 402 and 404 happen to execute periodically (driven by periodic events 406 and 408 via processing system 236 examining and acting on corresponding dependencies) and therefore accept as inputs indications that events 406 and 408 have occurred. In this regard, processing system 236 happens to use periodic events 406 and 408 to cause the periodic execution of user-designed modules 402 and 404 as designed by the author. However, the user-designed modules 402 and 404 could execute a-periodically if so designed. In such cases, instead of the periodic events 406 and 408, user 122 could have designed user-designed modules 402 and 404 such that processing system 236 uses some asynchronous mechanism to schedule execution of user-designed modules 402 and 404. For instance, the author could have designed user-designed modules 402 and 404 so that, should one of the inputs to rig state user-designed module 402 change, processing system 236 would cause rig state user-designed module 402 to execute and, should the operations report output thereby change, cause torque and drag user-designed module 404 to execute thereafter. Thus, in accordance with various embodiments, all or part of these dependencies were inferred by processing system 236 from declarations associated with the inputs and outputs of in user-designed modules 402 and 404. As is disclosed further herein, besides declaring the inputs and outputs, all that user 122 of the current embodiment does is (for the first use of an input, output, or other resource) identify that resource and its logical (and/or physical) location in system 100. Processing system 236 can thereafter maintain information about that resource in a database, table, or other information repository. For instance, for each resource, processing system 236 could maintain its location, origin, destination(s), etc. and perhaps the dependencies required to create it and those dependencies (partly) satisfied by it in that information repository.

As a result, when processing system 236 instantiates user-designed modules 402 and 404, processing system 236 examines the declarations of each of the user-designed modules 402 and 404 to determine whether either of the user-designed modules 402 or 404 depends on other modules (whether user-designed or not) using the data in that information repository. In the illustrated case, therefore, the declarations of torque and drag user-designed module 404 indirectly indicates that it depends on rig state module 402 executing beforehand because of its reliance on the output thereof (the operations report). Using the corresponding declaration of torque and drag user-designed module 404, the processing system 236 would schedule torque and drag user-designed module 404 after the execution of rig state user-designed module 402.

Moreover, each of the user-designed modules 402 and 404 can also declare which resources they require to execute. In FIG. 4, connectors 410, 412, 414, and 416 are associated with declarations of user-designed module 402 to the affect that rig state user-designed module 402 requires hook load, drill speed, bit depth, and hole depth drilling data 114 and 116 to execute as desired. Processing system 236 defaults the context of an instance of rig state user-designed module 402 to that context which user 122 has selected for that instance of rig state user-designed module 402. Thus, in the absence of a declaration to the contrary, rig state user-designed module 402 receives in-context instances of hook load, drill speed, bit depth, and whole depth data.

In the current embodiment, another declaration of rig state user-designed module 402 could specify that rig state user-designed module 402 will output a resource, here the operations report, via connector 418. As it happens, input connectors 410, 412, 414, and 416 (along with an indication of whether periodic event 406 has occurred) enable instances of rig state user-designed module 402 to execute as authored. Output connector 418 allows instances of rig state user-designed module 402 to output the operations report to a location accessible by the processing system 236 and which is associated with the current instance of rig state user-designed module 402 (and therefore the corresponding drilling rig 108, other drilling structures, or combinations thereof as envisioned by user 122).

The declarations of torque and drag user-designed module 404 specify as its inputs the hook load, torque, and operations report of some drilling rig 108 to be determined by context at instantiation time. Processing system 236 will usually assume that these inputs will be found in the context which user 122 has selected for the current instance of torque and drag module 404. The declarations of torque and drag user-designed module 404 also specify that its instances will depend on the in-context occurrence of periodic event 408. If, however, a connector calls to an extra-contextual API, the associated inputs and/or output(s) can cross context boundaries as illustrated by the arrows between user-designed modules 344 and 346 and user-designed module 348 (in FIG. 3).

Furthermore, if desired, user-designed modules 238 can output HTML files (or active objects) which can include scripts, code, etc. for performing tasks dependent upon the processing and context of the torque and drag user-designed modules 238 as desired by the authoring users 122. For instance, some active files or modules can generate alert emails for various users 122. Here the active file will be received from the torque and drag user-designed module 404 by the processing system 236 via the output connector 426 and, perhaps will be executed by processing system 236. Furthermore, the processing system 236 will associate the active file with the context associated with torque and drag user-designed module 404 unless otherwise declared. Thus, processing system 236 could modify the context-generic output (here, the active file) with information related to the drilling rig 108 corresponding to the current instance of torque and drag user-designed module 404. In the alternative, or in addition, a module could output an HTML file with an indication of the module's output, alert, etc. Processing system 236 could store the HTML and provide users 122 an URL to the HTML file which they could use to retrieve the information therein. Processing system 236 therefore allows module authors to provide context specific messages, indications, alerts, and other outputs. Moreover, processing system 236 allows users 122 to define what that user-designed context might be and therefore the constraints on input/output activity by user-designed modules 238 and other processes which can be enforced by processing system 236.

Processing system 236 also provides several other illustrative services to user-designed modules 402 and 404 (and/or other processes). For instance, processing system 236 orchestrates the occurrence of periodic events 406 and 408 as well as providing an indication of their occurrence via, if desired, input connectors to user-designed modules 402 and 404. In the alternative, or in addition, processing system 236 orchestrates the execution of instances of user-designed modules 402 and 404. More particularly, processing system 236 examines the declarations of the various user-designed modules 402 and 404, determines, the dependencies there between, schedules when various instances of user-designed modules 402 and 404 will execute relative to each other. Processing system 236 also causes their execution at in-context appropriate times (by, if necessary other processing platforms) while enforcing the appropriate contexts and/or handling extra-contextual API calls.

Furthermore, processing system 236 accesses in-context drilling data 114, 116, and other resources (for instance, information external to the current context or even the framework 300 via the extra-contextual APIs) and provides that information to user-designed modules 402 and 404 via input connectors 410, 412, 414, 416, 420, 422, and 424. Moreover, processing system 236 obtains from the user-designed modules 402 and 404 their outputs (here, the operations report and HTML file) as indicated by output connectors 418 and 426. Moreover, processing system 236 associates these outputs with the drilling structure corresponding to the context of user-designed modules 402 and 404 unless the declarations of the user-designed modules 402 and 404 specify otherwise.

Interestingly, module authors need not declare or otherwise specify that the operations report to be output via connector 418 is the same operations report to be input via connector 424 by, respectively, user-designed modules 402 and 404. Instead, the corresponding declarations of user-designed modules 402 and 404 cause processing system 236 to associate the operations report with, and retrieve it from, the appropriate context for instances of user-designed modules 402 and 404. In other words, processing system 236, using these declarations, routes the information from its source to its destination(s) with no point-to-point configuration being required of module authors or other users 122 once the corresponding resources are initially entered into the resource database, table, information repository, etc.

Thus, processing system, 236 automatically wires up graphs of modules when the declarations make the selections of inputs and outputs clear. If ambiguities exist with respect to the identity of an input or output, processing system 236 can flag the ambiguity for resolution by a user 122. For instance, if two operations reports exist, a module declaring an input of type opsReport might create an ambiguity needing clarification to identify the particular operations report of interest. In which case, input from the user 122 (or a more elaborate declaration) would allow processing system 236 to resolve the ambiguity.

Figure 5:
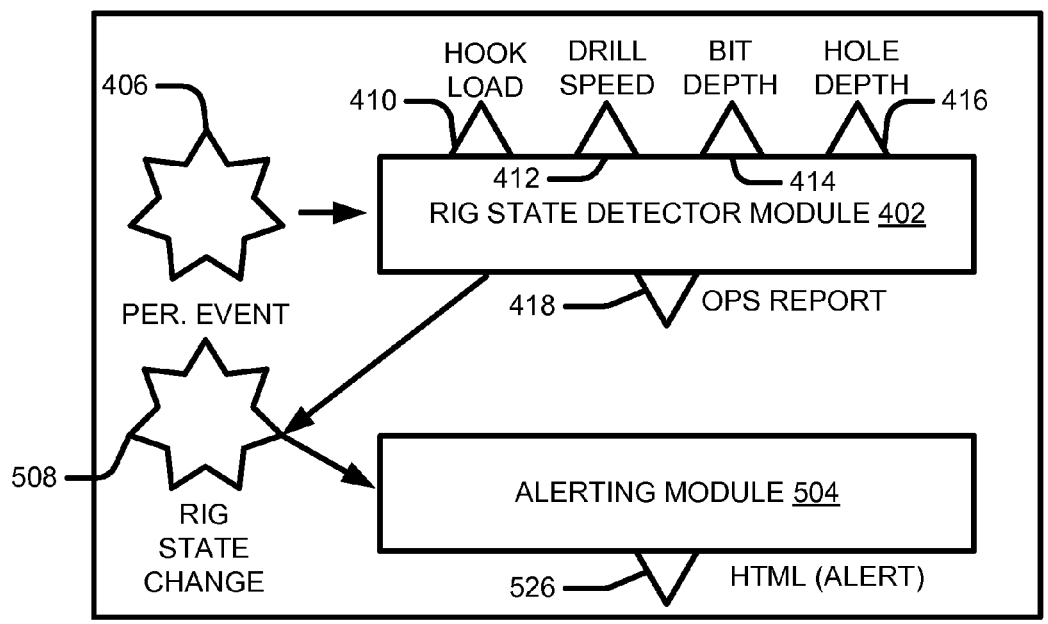
FIG. 5 also illustrates aspects of two drilling data processing modules.

FIG. 5 also illustrates aspects of two drilling data processing modules. More particularly, FIG. 5 again illustrates user-designed module 402 and periodic event 406. However, FIG. 5 also illustrates alerting user-designed module 504 and asynchronous event 508. Here, event 508 indicates that the condition 322 of a drilling rig 108 corresponding to an instance of event 508 has changed. Moreover, the declarations of alerting user-designed module 504 indicate that instances of alerting user-designed module 504 should execute after an in-context instance of event 508. Furthermore, the declarations of alerting user-designed module 504 indicate that its instances will produce alerts (as indicated at connector 526) of condition changes of corresponding drilling rigs 108. Here, for instance, an email could be sent to a user 122 noting the condition change of the drilling rig 108 at issue. Note that a condition change associated with some other drilling rig 108 (or rig context 316) would cause a different instance of event 508 to trigger a different instance of alerting user-designed module 504 but would leave the current instance (and other out-of-context instances) of alerting user-designed module 504 unaffected. That is, in the current embodiment, the processing system 236 associates the drilling data 114 and 116, events 120, modules 238, etc. of one drilling structure with that drilling structure and that drilling structure alone. The context enforcement mechanism of the current embodiment, therefore prevents cross-talk or bleed-over of drilling data 114 and 116 (and other resources) between different contexts and between different drilling structures (if the user-designed modules 238 were designed accordingly). Exceptions to this enforcement mechanism can be made via extra-contextual APIs as disclosed further herein.

Thus, processing system 236 orchestrates the execution of instances of various user-designed modules 238 in different contexts independently of one another with exceptions as called for. For instance, processing system 236 can monitor drilling data 114 and 116 waiting for the condition 322 of some drilling rig 108 to change. Note that when a rig condition change occurs, processing system 236 examines the context of that condition change and notifies the corresponding instance of alerting user-designed module 504 (residing within the same context) of the occurrence of that change. No other instances of alerting user-designed module 504 will ordinarily be notified since that condition 322 change does not (in the current scenario) correspond to them. Moreover, because processing system 236 knows that the particular instance of that particular alerting user-designed module 504 depends on the occurrence of a particular event 508 in a particular and corresponding context, processing system 236 schedules the corresponding instance of alerting user-designed module 504 to execute without executing other instances of alerting user-designed module 504. Once that instance of alerting user-designed module 504 executes and delivers its output, the processing system 236 receives the output as indicated by connector 526 and associates the alert with the current context.

As in other situations, the authors of the alerting user-designed module 504 need not bother with point-to-point configurations of the input drilling data 114 and 116 or the output drilling data 114 and 116 or scheduling the user-designed modules 238. Nor do the authors need to bother with determining on which drilling rig 108 the event 508 occurred. Processing system 236 obviates the need for such inefficient, cumbersome, and error-prone activities. Moreover, because users 122 need not worry about such scheduling issues, processing system 236 supports re-use of user-designed modules 238 in contrast to previously available single-purpose approaches which necessitate user 122 involvement in scheduling such single-purpose processes. Having discussed aspects of user-designed modules 238 it might be useful to discuss methods for processing data.

Figure 6:
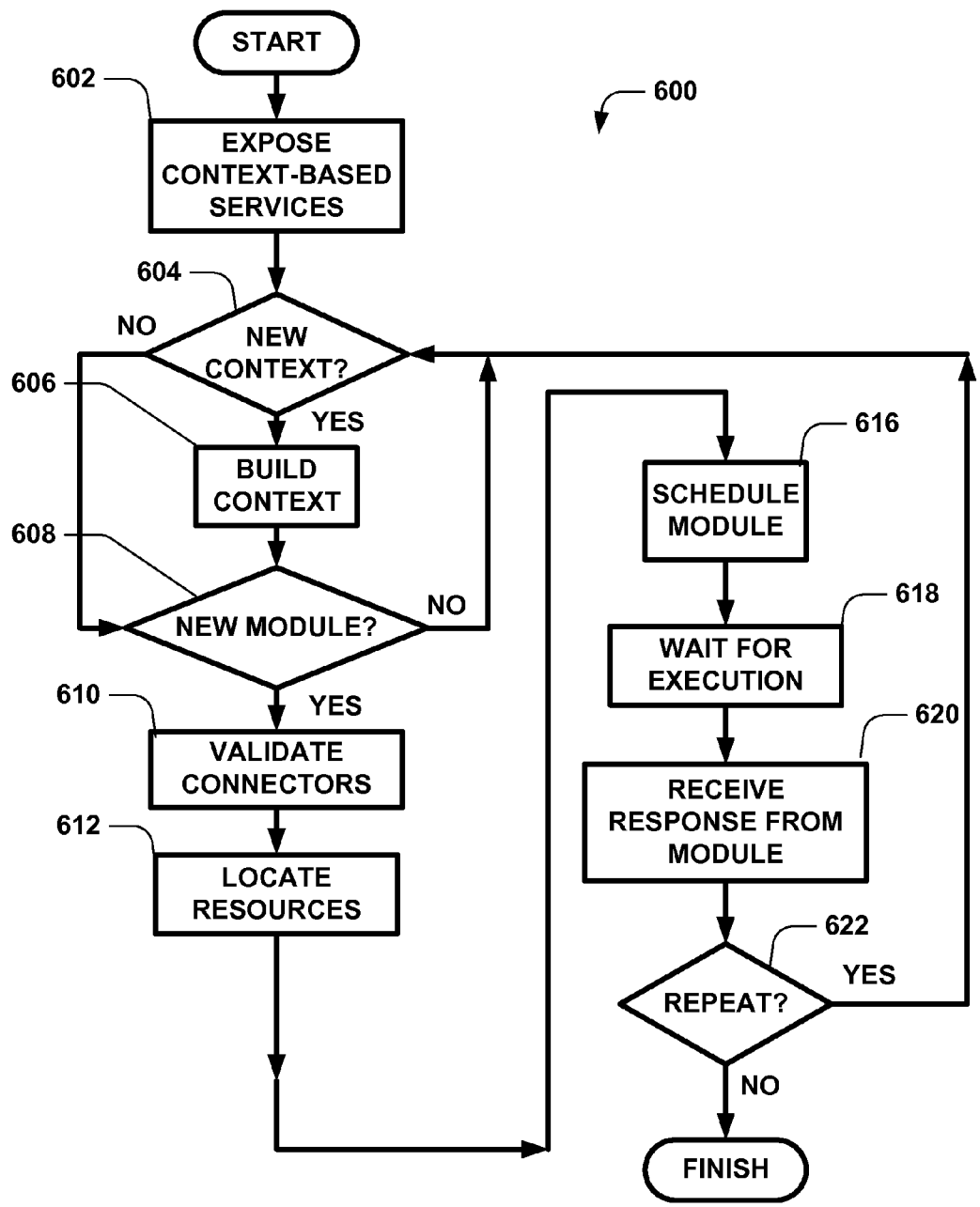
FIG. 6 illustrates a method of processing drilling data.

Thus, FIG. 6 illustrates a method of processing data. More particularly, FIG. 6 illustrates method 600 which can be executed by processing systems 236 of various embodiments. Method 600 can begin with a processing system 236 exposing context-based services associated with various drilling structures via a network 233 (for instance, the Internet). These services can include building, modifying, and deleting contexts (in frameworks 300 if used) as corresponding drilling structures appear and disappear from system 100 and/or as users 122 desire. Furthermore, method 600 can include building, modifying, or deleting objects corresponding to these drilling structures although doing so is not required for the practice of many embodiments. Moreover, the exposed services can include orchestrating the execution of various user-designed modules 238. For instance, the processing system 236 of some embodiments examines the declarations of user-designed modules 238 to determine upon which other modules or processes they might depend by examining the input data types which the modules declare and inferring which other modules supply those data types. Note that modules of embodiments also declare the output data types further enabling the identification of inter-module dependencies. See reference 602.

Thus, processing system 236 can examine the declarations of user-designed modules 238 to determine which pieces of drilling data 114 and 116 user-designed modules 238 might depend upon. If a piece of drilling data 114 or 116 might be current only after some other particular in-context user-designed module 238 executes, processing system 236 can include such a drilling-data-producing user-designed module 238 in the dependencies of the user-designed module 238 which it is scheduling. In addition, processing system 236 can expose services related to monitoring the dependencies of user-designed modules 238 and, services related to causing the instantiation and/or execution of user-designed modules 238.

Reference 604 illustrates that method 600 can include determining whether it is desired to add a new context(s) to framework 300 (see FIG. 3) or to a table, database, or some other information repository accessible by processing system 236. These new contexts might be called for when a new drilling structure appears in the system 100 or when a user 122 desires a new context. Thus, as new drilling rigs 108, wells 110, and/or wellbores 112 appear in system 100 and/or users 122 so desire, method 600 includes adding corresponding contexts (whether user-designed or otherwise) to framework 300. Moreover, since system 100 might change due to actions other than the addition of new drilling structures, method 600 can include modifying and deleting existing contexts 316, 318, and 320 to account for such real-world changes. Of course, authorized users 122 can initiate the modification, deletion, etc. of these contexts if so desired and at times and for reasons which they decide upon.

Processing system 236 can become aware of such modifications to system 100 in a variety of manners. For instance, processing system 236 can be configured to poll network services applications residing in system 100 for modifications to the networks 233 and data systems 216 residing therein. In the alternative, the network services applications could be configured to inform processing system 236 of such changes. In addition, or in the alternative, processing system 236 could be a portion of those network services applications of system 100. They could, thus, be aware of such changes due to their internal information. In other cases, processing system 236 could examine inbound communications from user-designed modules 238 and/or other processes for new IP (Internet Protocol) addresses or other logical or physical addresses (which can be included in such communications if desired). Of course, users 122 could inform processing system 236 of such modifications or otherwise configure processing system 236 to account for changes in system 100 or their desires by, for instance, modifying the available set of contexts. See reference 604.

In some situations, processing system will be able to automatically add, delete, and modify contexts accordingly. But, it might be the case that some situations will occur in which user 122 intervention can aid in resolving ambiguities in the process. Thus, processing system 236 of embodiments automatically adds, deletes, and modifies contexts when it can and otherwise flags users 122 where user intervention might be appropriate. Similarly, processing system of embodiments assists users 122 with identifying drilling data 114 and 116 (or types thereof) of interest and connecting such drilling data 114 and 116 to desired modules.

Furthermore, building the built-in contexts 320 can include associating appropriate objects with new contexts and associating drilling data 114 and 116 therewith. Thus, method 600 includes building, modifying, and deleting contexts as users 122 desire. See reference 606. If, on the other hand, no new context appears to be appropriate or called for) at a given time, method 600 can continue as indicated by the branch from decision 604 to reference 608.

At some point, a new user-designed module 238 might be introduced into system 100. See reference 608. Usually, as is disclosed further with reference to FIGS. 7-10, processing system 236 learns of the existence or creation of a new (or modified) user-designed module 238 (or instance thereof) through registration and/or instantiation as desired by users 122. Instantiation (or for that matter registration, a technique similar to initiation but occurring before run time) of a new user-designed module 238 includes validating the connectors of the new user-designed module 238.

To validate the connectors, processing system 236 of the current embodiment confirms that the metadata of the connectors refer to actual pieces of drilling data 114 and/or 116 in some context in the system 100 (or, perhaps, generated by other user-designed modules 238 therein). More particularly, since various context-generic pieces of drilling data 114 and 116 are, in some embodiments, all associated with several similar contexts, the processing system 236 need not search the entire system 100 for the particular pieces of drilling data 114 and 116. Rather, the processing system 236 can limit its search to one of each type of context that it has knowledge of or can otherwise locate (and any external data that might likely be called for by a connector). For instance, systems 100 which use a framework 300 might have many instantiations of similar (or perhaps even nearly identical) contexts for similar drilling structures and/or corresponding objects, functions, etc. Once a context-particular piece of drilling data 114 and 116 is located, processing system 236 merely needs to alter the context to another similar context to locate other context-particular pieces of similar drilling data 114 and 116 (see reference 612).

For instance, almost all drilling rigs 108 will generate a drilling string 202 torque measurement. Once processing system 236 finds one torque measurement in one rig context 316, it can assume that similar torque measurements will be found in other rig contexts 316. Processing system 236, of course, can verify such assumptions by querying the data systems 216 or users 122 of corresponding drilling rigs 108 (or other drilling structures). Processing system 236 can also confirm the measurement units used and otherwise eliminate the effects of various data homogeneity and heterogeneity issues by similar techniques. At module execution time, which might be some time other than module instantiation time, processing system 236 of the current embodiment uses the context associated with the current instance of user-designed module 238 (the instance being spawned in this scenario) to locate the in-context piece of drilling data 114 or 116 actually called for (or produced by) that instance of that user-designed module 238. Thus, not only do the connectors allow processing system 236 to find in-context drilling data 114 and 116 for each instance of each user-designed module 238, they also allow users 122 and module authors to avoid much or all of the inefficient, cumbersome, and error-prone single-purpose and/or point-to-point configuration efforts. If, for some reason, the validation activities of reference 610 fails, processing system 236 can alert the author of the module 238 or some other user 122.

With continuing reference to FIG. 6, reference 616 illustrates method 600 scheduling the execution of one or more user-designed modules 238. As disclosed further elsewhere herein, the declarations and connectors of each user-designed module 238 allow processing system 236 to determine dependencies between modules or other processes. Using these dependencies, processing system 236 determines the order of execution of the various user-designed modules 238 and whether they can execute in parallel, serially, etc. Note that, in many cases, all user-designed modules 238 involved will be associated with a particular context. However, by examining the connectors (and/or associated declarations, APIs, etc.), processing system 236 can determine whether any extra-contextual interactions between modules or other processes might occur at module instance execution time. In such cases, processing system 236 can examine the schedule of execution in the other contexts at issue to ensure that each dependency will be satisfied despite the potential for such a schedule to cross context-related boundaries. It might be worth noting here that when a module does declare an extra-contextual input/output, processing system 236 will in many cases do what it can to identify the corresponding entities. But, extra-contextual connectors carry with them a possibility that they will create an ambiguity that user 122 intervention could resolve. In such cases, processing system 236 can flag user 122 if such an ambiguity arises. Nonetheless, processing system 236 will connect in-context drilling data 114 and 116 and other resources to the in-context instances of the user-designed modules 238 involved according to connector metadata (including extra-contextual data declarations and/or APIs). With instances of user-designed modules 238 scheduled for execution, method 600 can wait for their dependencies to be satisfied before executing these instances of user-designed modules 238 if appropriate. See reference 618.

When some dependency becomes satisfied, FIG. 6 illustrates processing system 236 executing those instances of user-designed modules 238 for which all dependencies (for instance, dependencies based on instances of other user-designed modules 238, events 120, drilling data 114 and 116 availability/updates, etc.) have been satisfied. For instance, those instances of user-designed modules 238 that previously had all dependencies except the current one satisfied can be executed and usually will be. See reference 620. Moreover, as might often be the case, as an instance of a user-designed module 238 executes it might generate one or more responses. These responses can include the output of new drilling data 114 or 116, the output of an HTML file or further events, the execution of a control function, etc. Processing system 236 can accept the response(s) and route these new or updated resources to the destinations (user-designed module 238 instances, for instance) indicated by the connectors of user-designed modules 238.

If desired, method 600 can repeat as indicated by reference 622. In the current embodiment, if new contexts 320 or user-designed modules 238 (or instances thereof) appear in system 100, processing system 236 can loop through portions of method 600 until some input (or a user 122) indicates that no further processing is desired. Having discussed activities generally associated with processing system 236, it might now be useful to discuss activities generally associated with a particular instance of a user-designed module 238.

Figure 7:
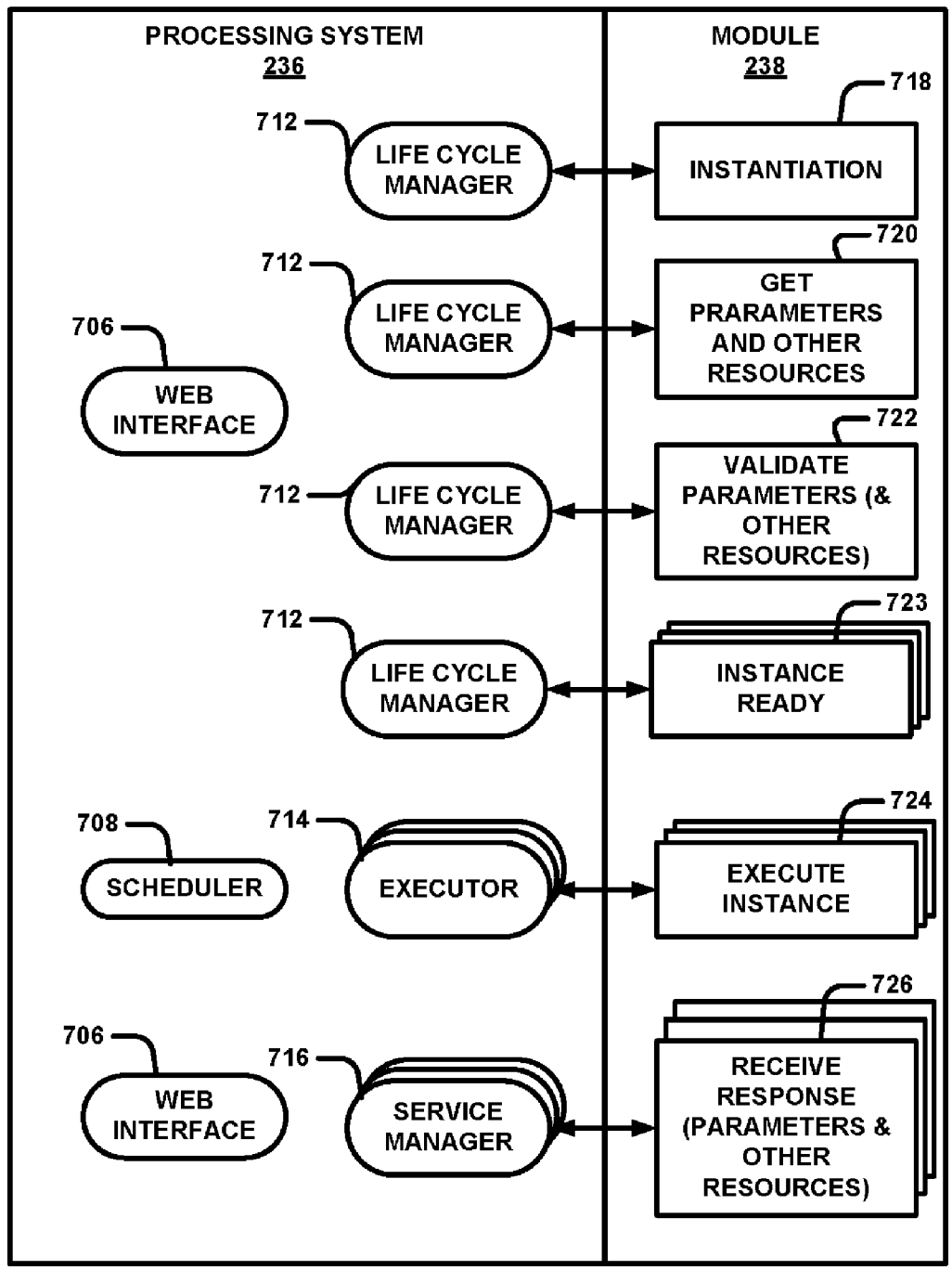
FIG. 7 illustrates aspects of a module for processing drilling data.

Thus, FIG. 7 illustrates some aspects of a drilling data processing module. More particularly, FIG. 7 illustrates aspects of processing system 236 and user-designed modules 238 as the life of a particular instantiation of user-designed module 238 progresses. Generally, processing system 236 includes functions such as web interface 706 and scheduler 708 functions. Processing system 236 also includes life cycle manager 712, executor 714, and service manager 716 functions. Executor 714 is associated with scheduler 708 of the current embodiment while life cycle manager 712 and service manager 716 are associated with web interface 706. Over the life of an instance of user-designed module 238, the instance passes through phases such as instantiation 718, getting resources 720, validation 722, ready 723, execution 724, and output 726 as illustrated by FIG. 7. Each row of FIG. 7 therefore generally represents a phase of a module's existence in which processing system 236 calls a corresponding method on the instance of the module such as "initialize (or instantiate) yourself," "get parameters from the user," "execute," etc. The ready 723 reference being an exception to this rule of the current embodiment. Of course, once processing system 236 performs some tasks for a particular user-designed module 238 those tasks (and the associated instance phases) need not be revisited. For instance, validation of a particular user-designed module 238 usually occurs only once no matter how many instances of a particular user-designed module 238 which processing system 236 spawns.

That being said, instantiation phase 718 of a user-designed module 238 typically begins when user 122 determines that they wish to have an instance of user-designed module 238 instantiated. As a result, processing system 236 gets the parameters from the user-designed module 238 by asking it to present an HTML form on which the users 122 can enter or select the parameters for the module. See reference 720. Life cycle manager 712 might also validate the resources it located (including drilling data 114 and 116) as declared by the connectors of user designed module 238 (see reference 722). In addition, processing system 236 might conduct a preliminary location of these resources at this time by, for instance, searching each type of context present in framework 300 and/or in a table, database, or other information repository for context-particular instances of that drilling data 114 or 116. If user 122 does not request scheduling or execution of the instance of user-designed module 238, processing system 236 can pause (with respect to that instance of that module) after preliminarily locating those resources. Additionally, processing system 236 schedules the execution of the current instance of the instantiated user-designed module 238 in accordance with the declarations and/or connectors of the user-designed module 238.

Thus, at some point the current instance of user-designed module 238 becomes ready to execute which may/may not be considered a phase. But it is shown in FIG. 7 to indicate that at some point, processing system 236 has readied user-designed module 238 for instantiation and execution. See reference 723. For instance, all of its in-context dependencies might become satisfied. If that instance of that user-designed module 238 is ready for execution, executor 714 of processing system 236 communicates to the current instance of user-designed module 238 (or the corresponding drilling rig 108 data system 216) that that instance may execute and can also pass along current in-context drilling data 114 and 116 (and other resources be they in-context or not) as specified by the connectors of user-designed module 238. Responsive to that communication from processing system 236, the current instance of user-designed module 238 begins executing perhaps by processing the drilling data 114 and 116 provided by processing system 236. See reference 724. At some point, the current instance of user-designed module 238 executes sufficiently so as to produce an output or other response in accordance with its connectors. For processing real-time data from a drilling rig 108, for instance, system 216 communicates the response to service manager 716 via network 233 (see FIG. 2) and web interface 706. Service manager 716 routes the response to its intended destinations (whether in-context or not) in accordance with the connectors of user-designed modules 238. The current instance of user-designed module 238 can continue executing or it can terminate depending on how it is designed. However, processing system 236 is not limited to processing real-time drilling data 114 and 116 from a drilling rig 108. Processing system 236 can process many types of data including historic or pre-recorded data. For instance, a user 122 might want to examine some down-hole data with a different filter than the one(s) initially used to study a particular wellbore 112. Processing system 236 can support such activities as well as processing real-time drilling data 114 and 116.

For instance, in some embodiments, processing system 236 allows a module authoring user 122 to design user-designed modules 238 to create (or cause the creation of) hypertext documents or HTML (Hyper Text Markup Language) files conveying in-context information to users 122 who might want to view the results of some processing task. Since any job might execute repeatedly, some users 122 might find it convenient to have the output generate by each execution in a separate file. Moreover, because interested users 122 might be distributed throughout system 100 (geographically and logically) using hyperlinks to access the results can be beneficial. Thus, in the current embodiment, each time an instance of some user-designed modules 238 executes it generates a hypertext output file. Processing system 236 then exposes that HTML file to various users 122 via a hyperlink.

Recall that on the web, we use URIs (Uniform Resource Identifiers) a.k.a. URLs (Uniform Resource Locators) to identify resources that web browsers or similar programs can retrieve. Processing system 236 makes the HTML files generated by some user-designed modules 236 accessible via corresponding URIs. Moreover, some of these HTML files produced by instances of various user-designed modules 236 can contain hyperlinks designed by these user-designed modules 238. When a user 122 clicks one of those links or otherwise causes the user agent (or web browser or other program) to retrieve a resource (for instance drilling data 114 or 116), that request goes to processing system 236 which routes it down to that instance of that user-designed module 238. Processing system 236 of the current embodiment calls the resource phase method of the user-designed module 238, and passes the resource phase method the URI requested by the agent. To do this, processing system 236 informed the user-designed module 238, in some earlier phase (perhaps execution phase 724), of some base URI that the instance can add to, to construct URLs that processing system 236 can route down to the instance of user-designed module 238 at some desired time.

In some embodiments during the execute phase 724, processing system 236 passes the instance a parameter such as "appbaseURI" that might be http://myserver/rigStateApp/, and another parameter "appInstanceURI" that might be http://myServer/rigStateApp/32544/id/. The module can use these parameters to construct URLs to place information, during execute phase 724, into some output HTML file.

More specifically, a user-designed module 238 titled "Rig-Condition Estimator" and designed to estimate the condition of a drilling rig 108 might write out the hyperlink <a href="http://myServer/rigStateApp/32544/currentState">Show Current State</a> into the HTML file. Here, the module appended some suffix meaningful to itself, to the base URI. A user can retrieve the HTML page output by one execution of this user-designed module 238 by clicking a link to it on a page in a user interface of processing system 236 or of some processing device.

Users 122 viewing that HTML page will see a (blue) highlighted link saying "Show Current Depth". Users 122 can click that link to cause their agents to request from web interface 706 of processing system 236 that resource. Processing system 236 of the current embodiment is designed to inspect the first part of the URL and see that it follows a pattern that indicates that processing system 236 should route the call down to the "rigStateApp" an instance (here, instance id 32544) of user-designed module 238 for processing. Processing system 236 can do so by looking in its memory or other storage location (for instance data repository 126) for that instance and invoking its "resource" method, passing as a parameter, the requested URI: http://myServer/rigStateApp/id/32544/currentState. In addition, processing system 236 can also pass other information about the request to the module, including the HTTP (Hyper Text Transfer Protocol) method, the HTTP headers, etc.

The resource method of that user-designed module 238 can return a string value that can be HTML for processing system 236 to return to the user's agent. In the current embodiment the Rig State Estimator user-designed module 238 might return "<html>Drilling</html>". In this way, processing system 236 can start running processing jobs that interact with users 122 as the jobs run. The user-designed module 238 can construct rich HTML web applications that can use AJAX (Asynchronous JavaScript and XM) calls to interact with the running module instance, allowing users 122 to query, or update its state.

It's also possible for a user-designed module 238 to define "application-wide" resources. Remember above, the processing system 236 of the current embodiment passed two base URLs to the user-designed module 238: one was a prefix for instance-specific resources (appInstanceURI) and the other is for "application-wide" or "instance-agnostic" resources. These latter resources would be resources shared by all running instances of a particular user-designed module 238. More specifically, all Rig State user-designed modules 238 of the current embodiment might display a common graphical icon that is the same for all instances. Processing system 236 can invoke the resource method on an instance of that user-designed module 238, or, for application-wide URIs, on the user-designed module 238 itself. So in the current embodiment, processing system 236 can route the request down to the proper running instance, but if the URI matches the prefix for application-wide resources, then processing system 236 can route the request to the user-defined modules 238 in general, and not any particular instance.

With continuing reference to reference 726, once the built-in (or user-designed) processing is performed, processing system 236 can wait for the next call for an instantiation of user-designed module 238 and/or the satisfaction of some dependency.

Of course, more than one instance of user-designed module 238 could be executing at any given time along with instances of other user-designed modules 238. Indeed, because system 100 might have many different data systems 216 operating on (or in conjunction with) various drilling structures, instances of other user-designed modules 238 could be executing concurrently in many places in system 100. For instance, in an embodiment of system 100 with multiple drilling rigs 108, multiple instances of user-designed modules 402, 404, and 504 (see FIGS. 4 and 5) could be in various phases of their life cycles throughout system 100 with processing system 236 maintaining framework(s) 300 (or a table, database, or other information repository); instantiating and executing user-designed modules 238, enforcing contexts, and providing and/or receiving drilling data 114 and 116 and other resources to/from instances of user-designed modules 238.

Figure 8:
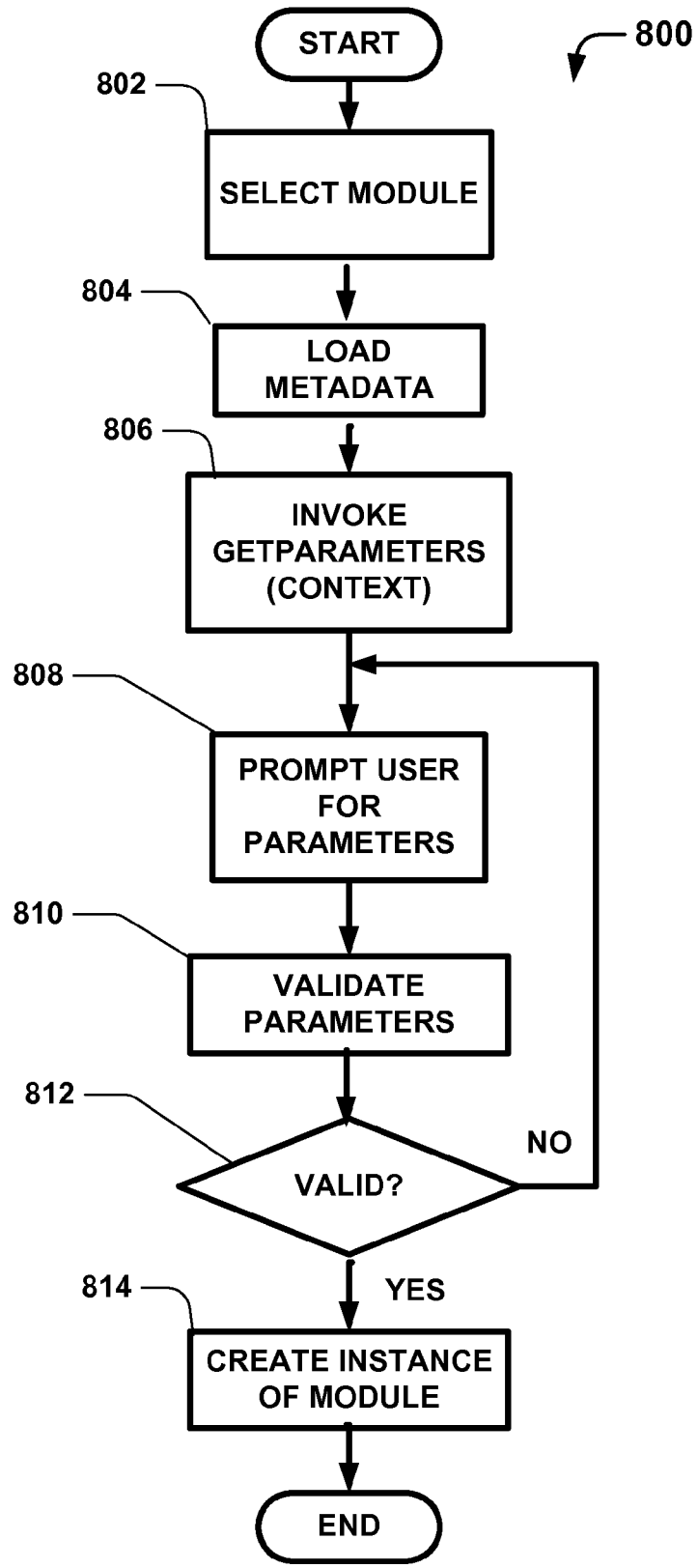
FIG. 8 illustrates a method of setting up a drilling data processing job.

FIG. 8 illustrates a method of setting up a drilling data processing job. More particularly, FIG. 8 illustrates a method of setting up a drilling data processing job for execution. In methods of the current embodiment, a job is an instance of a user-designed module 238 which will execute in a particular context and often in response to some event. Thus, where the event occurs repeatedly in a particular context, the job will execute repeatedly responsive thereto to repeatedly deliver some desired functionality. Furthermore, should the user-designed module 238 be dependent on other modules or processes for its inputs or other resources, instances of those user-designed modules 238 and processes will execute in an order which provides that desired functionality in a reliable manner.

With continuing reference to FIG. 8, method 800 can begin when a context building user 122 decides to add a job (or user-designed module 238) to a context. In the current embodiment user 122 accesses any of the computing platforms in system 100 (or in communication therewith) and can start a wizard for setting up an instance of the job in the context. The wizard can present a list of pre-existing user-designed modules 238 and contexts from which user 122 selects the context and the module to add to that context. See reference 802. Of course, the wizard could include an option to build a new user-designed module 238 if desired and/or could default to the current context if the context building user fails to select a context. In that way, if user 122 is adding multiple user-designed modules 238 to a given context (for instance, some wellbore context) user 122 need not repeatedly select the context.

Once user 122 selects the user-designed module 238 of interest, the wizard examines the metadata associated with the connector(s) of the user-designed module 238. To do so, it examines the declarations (and/or metadata) related to the inputs and outputs of the user-designed module 238 as well as any events, data types, resources, etc. associated with the selected user-designed module 238. See reference 804. At some point, the wizard invokes a function to get the parameters (for instance, various pieces of drilling data 114 and 116, events, etc.) already associated with, or available to, the current context. In addition, the wizard could provide an option on its user interface (UI) for the user 122 to select parameters from other contexts if desired. The call to the function could take a form such as getParameter(context). See reference 806. In some embodiments the desired instance of the user-designed module 238 could be instantiated at reference 806.

As FIG. 8 also illustrates (at reference 808) the UI could include a form which prompts user 122 to enter (or select) the parameters of interest for the current user-designed module 238. The form could be an HTML form and could allow user 122 to enter names for the parameters to be added to the instance of module 238 to be created. With the parameters selected in this manner, or others, the wizard could invoke another function to validate the parameters as reference 810 illustrates. The call to the function could therefore include parameter: context pairs (when extra-contextual drilling data 114 and 116 is involved) or could be a list of the parameters and the selected context of interest.

Note that, typically, a user-designed module 238 will execute using resources in one and only one context. If a user 122 designs a user-designed module 238 that includes inputs from more than one context (for instance two wellbore contexts), processing system does not open two contexts to execute that user-designed module 238. Instead, the user 122 could select to use an extra-contextual API or could build a context (provided that the user 122 has appropriate privileges) incorporating appropriate objects that would otherwise be in the two or more contexts. In some embodiments, processing system 236 provides a user interface that allows users 122 to do so.

The validation function can then run and return an indication of the success/failure of the validation(s) attempted. If the validation function fails to validate the parameters (for instance, the user entered an invalid parameter), method 800 can return to reference 808 and prompt the user 122 to correct or otherwise modify the list of parameters for the instance of the user-designed module 238 being added to the selected context. Otherwise, as illustrated by decision 812, method 800 can proceed to reference 814

At reference 814, the wizard can create the desired instance of the user-designed module 238 in the desired context with its in-context and/or extra-contextual parameters validated. In addition, the wizard can save the state of the newly created instance either implicitly or explicitly. Respectively, the saving can be by way of serializing the module instance using the facility(s) provided by the programming language being used or by way of invoking a function of processing system 236 to do so. If processing system 236 has such a function it could take a form such as saveState(context):object which gets the values of the in-context and extra-contextual parameters and returns an object with property:value pairs representing the state of the object. Thus, method 800 allows a context building user 122 to add an instance of a user-designed module 238 to a context which includes selecting the parameters for that instance of that module whether in-context or extra-contextual.

Figure 9:
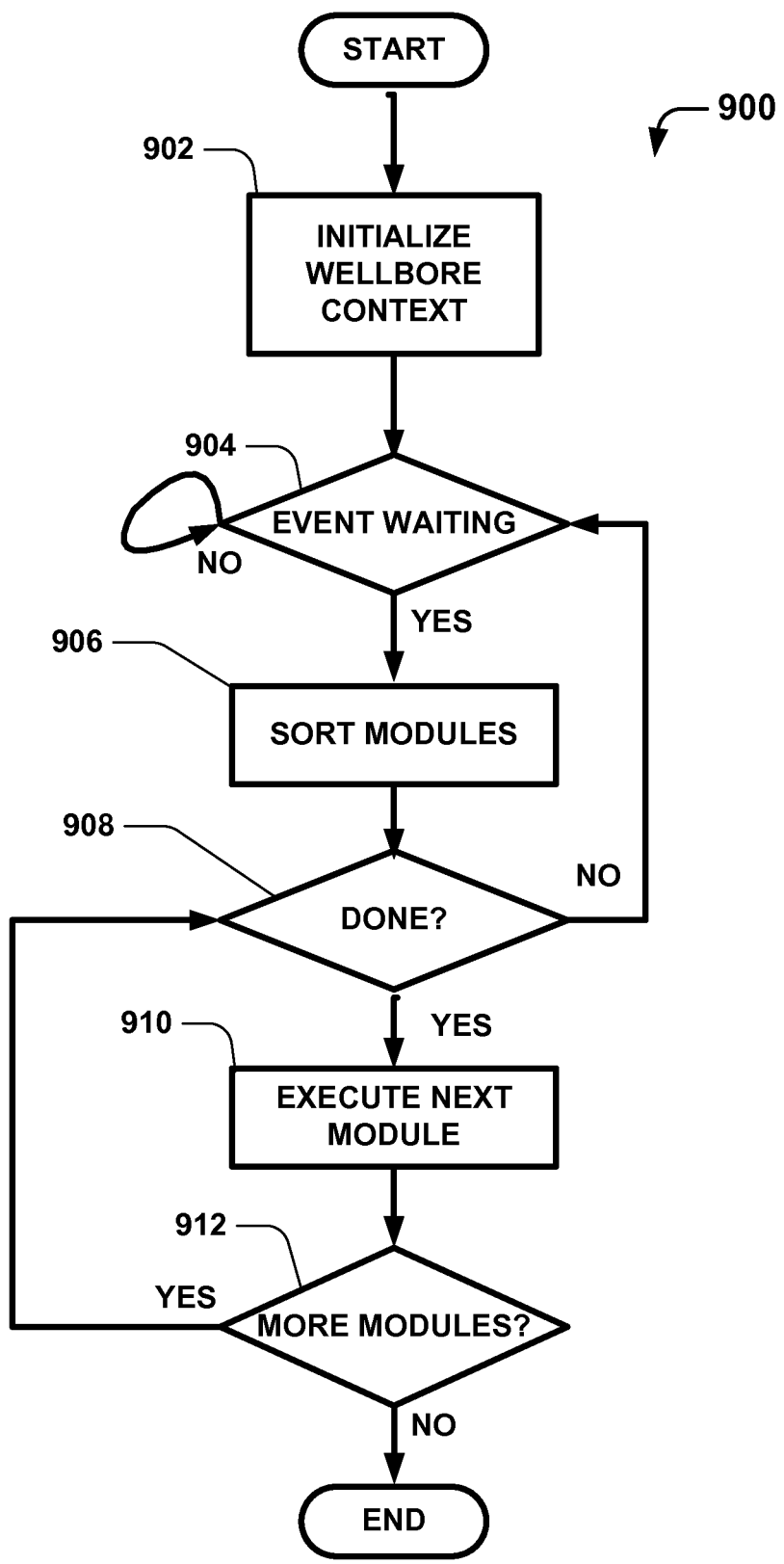
FIG. 9 illustrates a method of executing a drilling data processing job in a context.

With respect now to FIG. 9, the drawing illustrates a method of executing a drilling data processing job in a context. More particularly, once a user-designed module 238 has been instantiated in a particular context by some method such as method 800, processing system 236 can begin executing that instance. Method 900 illustrates that the execution of a module instance can begin with initializing the context if it is not initialized or if user 122 desires to do so. See reference 902. Since many user-designed modules 238 can be designed to wait for the occurrence of an event before executing, method 900 includes waiting for such an event to occur. See reference 904. If the event has not occurred, method 900 can wait at reference 904 as indicated by the "no" loop. However, if the event occurs, processing system 236 can proceed to reference 906.

It is noted here that in some embodiments, all user-designed modules 238 are designed to be driven by events. Some user-designed modules are driven by periodic events that processing system 236 fires at some selected frequency. Indeed, some user designed modules 238 can be designed to be driven by one and only one periodic event so that they execute periodically if desired. Of course, other events can be aperiodic, logical, physical, arising from conditions in system 100, generated by user-designed modules 238, etc. Moreover, user-designed modules 238 of some embodiments include metadata identifying the types of events it will respond to thereby allowing processing system 236 to notify these user-designed modules 238 when pertinent events occur in system 100.

At reference 906, processing system 236 of the current embodiment sorts the user-designed module 238 instances in the context according to their dependencies. In part, processing system 236 can do so by examining the declarations of the user-designed modules 238 and determining which in-context user-designed module 238 instances depend on other module instances (or other processes) for inputs and other resources with which to operate. Processing system 236 can therefore order those module instances which generate outputs used by other module instances (as inputs) earlier. At some point, processing system 236 settles on a schedule for the execution of the module instances so that each module instance will receive new or updated inputs (and/or other resources) from the other modules (and/or other sources). Processing system 236 therefore orchestrates the execution of the module instances with dependent module instances to be run in series with (and after) the module instances on which they depend. Processing system 236 also schedules the execution of other module instances in parallel or at other times than the dependency-pairs of module instances.

At reference 908 processing system 236 determines whether the scheduling generated at reference 906 is complete. In other words, processing system 236 can check for additional events that might have occurred during the scheduling at reference 906 and re-schedule if desired. Of course, processing system 236 can instead execute the recently generated schedule before checking for additional events which might be waiting to be processed. Either way, processing system 236 begins executing module instances according to the schedule which it arrived at via references 904, 906, and 908. See reference 910.

Processing system 236 can begin execution with the module instance satisfying the earliest dependency in the schedule and/or module instances which the schedule indicates can execute in parallel therewith. Processing system 236 works its way through the schedule until all of the module instances in it have executed. See reference 912. Processing system 236 can repeat method 900 for each context as might be desired and repeatedly do so until all module instances in all contexts have executed or until processing system 236 is paused or stopped by a user 122. In the alternative, processing system 236 can be configured to loiter at reference 904 when no modules are ready to execute waiting for events to happen and then precede through method 900 as desired. Thus, processing system 236 can orchestrate the execution of the various instances of the various user-designed modules 238 (and other processes) through-out system 100 not just those associated with a particular drilling structure or a particular context.

In some embodiments though, processing system 236 does not serialize the user-designed modules 238 instead processing system 236 uses an anarchic model to schedule user-designed modules 238 for execution. In the current embodiment each user-designed module 238 runs on its own schedule executing (in many cases) periodically driven by some periodic scheduling event. Of course, the frequency of execution can be selected and designed into the corresponding scheduling event for any given user-designed module 238. For instance, some user-designed modules 238 can be designed to run at 1 minute intervals, 5 minute intervals, or even faster or slower. Each time through the loop, executor 714 waits for the next periodic scheduling event to fire and then executes those user-designed modules which, according to their event-related metadata, have been designed to execute based on the pertinent scheduling event. Processing systems 236 of some embodiments include one such loop for each user-designed module 238. Again, see reference 906, 908, 910, and 912.

Figure 10:
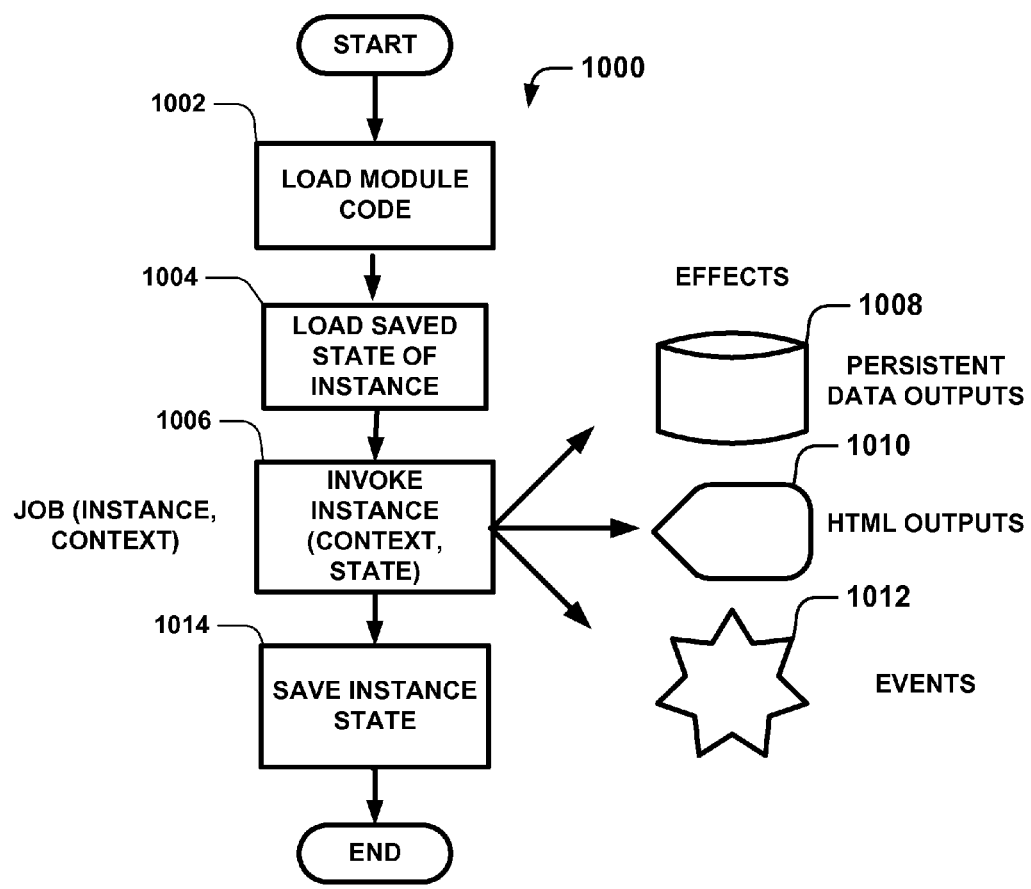
FIG. 10 illustrates a method of executing a drilling data processing module in a context.

FIG. 10 illustrates a method of executing a drilling data processing module in a context. More particularly, FIG. 10 illustrates method 1000 in which processing system 236 executes a particular in-context user-designed module 238 instance. Method 1000 can begin by loading the code of the user-designed module 238 into memory. The code can take any convenient form such as being a script, a dynamic link library (dll), etc. See reference 1002. Processing system 236 can also load the saved state of the user-designed module 238 instance into memory from persistent storage or can indicate to a data processing system 216 of some drilling structure to do so. See reference 1004.

At reference 1006, processing system 236 invokes the user-designed module 238 instance within the appropriate context and with its retrieved state. As the user-designed module 238 instance executes it accepts inputs and resources from its context (via processing system 236 and various network intermediaries) and generates outputs. Those outputs can take many forms. For instance, some module instances can generate drilling data 114 and/or 116 in WITSML format for inclusion in a data repository, input/output file 240, and/or persistent storage. See reference 1008. In addition, or in the alternative, a user-designed module 238 instance could generate an HTML formatted output 1010 or an event(s) 1012 if the user 122 designed into user-designed module 238 those effects (or side-effects as the case might be). Method 1000 also includes saving the state of the user-designed module 238 instance at some point typically during or after the execution of the user-designed module 238. The saving of that state can be to some persistent memory if desired. See reference 1014.

Figure 11:
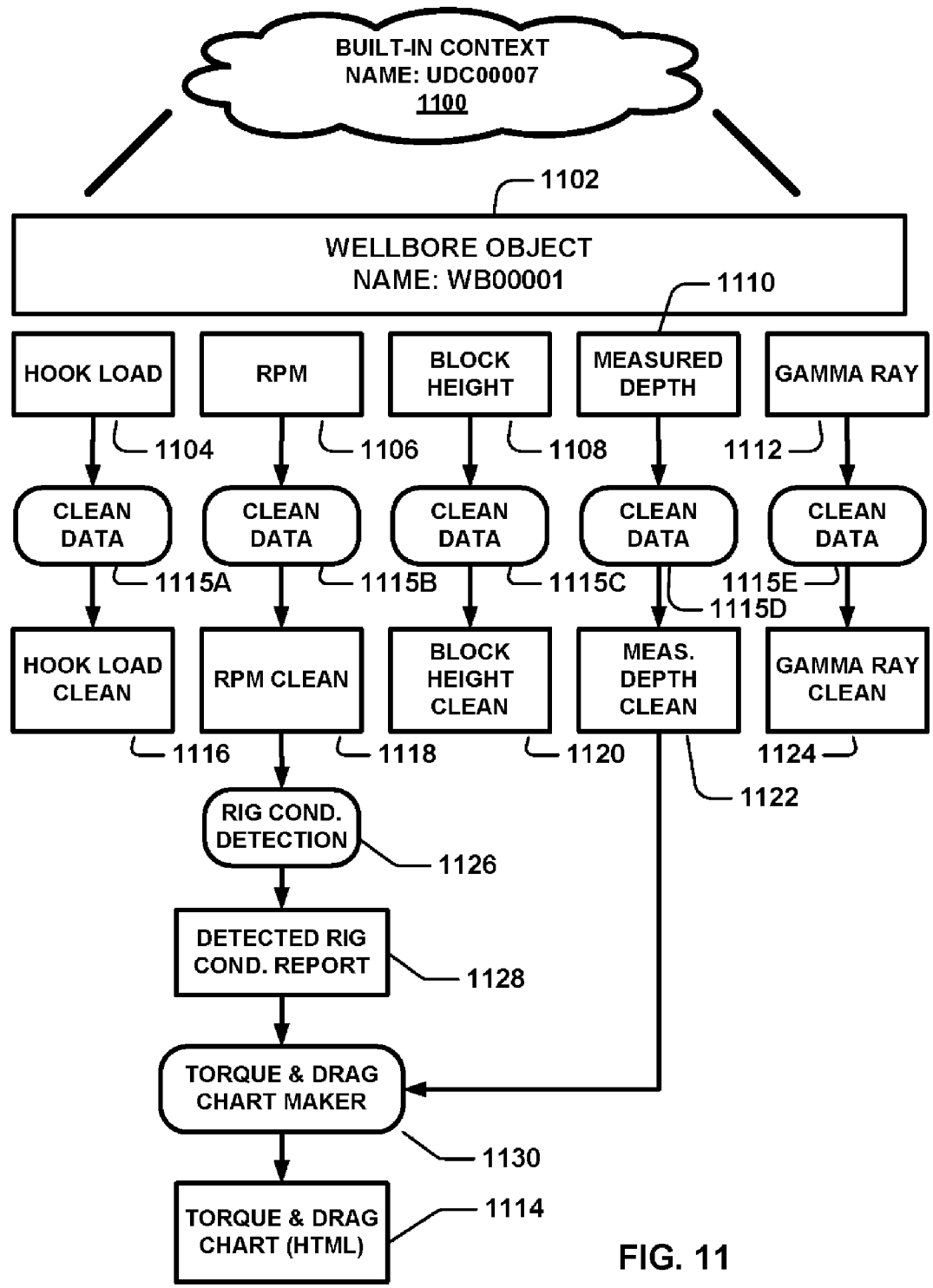
FIG. 11 illustrates aspects of a user-designed context.

FIG. 11 illustrates aspects of a user-designed context. More specifically, FIG. 11 illustrates user-designed context 1100 (named by user 122 as "UDC00007") which was apparently built to enable processing of data related to the torque and drag of wellbore WB00001. As such it happens to include wellbore object 1102 which corresponds to wellbore WB00001. However, this association was created because the context building user 122 chose to place wellbore object 1102 in user-designed context 1100 although context building user 122 could have chosen not to do so. Indeed, user 122 could have built user-designed context 1100 from the individual pieces of drilling data 114 and 116, the resources, etc. which taken together comprise wellbore object 1102. In addition, or in the alternative, user 122 could have built user-designed context 1100 from a subset or a superset of those components or from entirely different sources, objects, etc. User 122 therefore designs such contexts and (via context-based security mechanisms provided by processing system 236) determines the input/output behavior allowed to instances of modules therein by processing system 236.

As mentioned previously, user-designed context 1100 enables processing of drilling data 114 and 116 related to the torque and drag of wellbore WB00001. As such, the context building user 122 included in the design of its modules input connectors (via related declarations) for the following in-context pieces of drilling data 114 and 116: hook load 1104, RPM 1106, block height 1108, measured depth 1110, and (incidentally) gamma ray 1112. Taken together, these inputs enable the user-designed modules in user-designed context 1100 to generate torque and drag chart 1114 (see the lower portion of FIG. 11). Indeed, if user-designed modules in user-designed context 1100 were to connect to an HTML editing resource they could generate HTML versions of torque and drag chart 1114 which could be programmed to be e-mailed to various users 122. Note that a context building user 122 could choose to include user-designed context 1100 in system 100 (at various locations) as a built-in context such as wellbore context 132 of FIG. 1.

Furthermore, FIG. 11 illustrates other aspects of system 100. For instance, in system 100 of embodiments user-designed and/or built-in contexts such as user-designed context 1100 define a scope. In this manner, "things in a context" are ordinarily containers like wellbores. When a user queries such user-designed contexts 1100 for all logs (or other drilling data 114 or 116), system 100 returns all logs in that user-designed context 110. For instance, if user-designed context 110 corresponds to a wellbore, system 100 returns all logs associated with that wellbore 112. Similarly, if a user-designed context 1100 corresponds to some field 106, system 100 would return all logs associated with that field 106. Thus, if a user-designed context 1100 includes logs from two wellbores 112, a query would return both sets of logs. Ordinarily, but not always, user-designed contexts 1100 correspond to one drilling structure.

Apparently, user 122 realized that these input pieces of drilling data 114 and 116 might have data homogeneity issues, data heterogeneity issues, etc. Therefore, user 122 included in the design of user-designed context 1100 clean data module 1115 and declared that each of the foregoing pieces of drilling data 114 and 116 would connect as inputs to separate instances of clean data module 1115. This user selected design therefore implies that at times clean data module instances 1115A-1115E might exist in user-designed context 1100 in various combinations (determined at least in part by the scheduling of their execution). Each instance of clean data module 1115 therefore outputs (via an output connector and associated declaration) a version of (whatever drilling data 114 and 116 was declared as) its input which it cleaned of data homogeneity and heterogeneity issues (among others). Accordingly, user 122 also designed user-designed context 1100 to include hook load-clean 1116, RPM-clean 1118, block height-clean 1120, measured depth-clean 1122, and gamma ray-clean 1124 pieces of output drilling data 114 and 116. In this situation, a context building user 122 chose to run these jobs in a particular user-designed wellbore context. As a result, executor 714 exposed only the pertinent drilling data 114 and 116 to the module instance.

Moreover, context building user 122 included rig-condition detection user-designed module 1126 in user-designed context 1100 to aid in generating torque and drag chart 1114. For inputs, user 122 declared hook load-clean 1116, RPM-clean 1118, and block height-clean 1120 to create corresponding input connectors. User 122 also designed rig-condition detection user-designed module 1126 to output computed rig condition report 1128 (in WITSML format as an operations report) as an output piece of drilling data 114 and 116. Of course, user 122 declared this output to create a corresponding connector for rig-condition detection user-designed module 1126. Here, declare takes on two meanings. Namely, designating drilling data 114 and 116 for input/output connectors which end users of some embodiments do and declaring metadata about modules which module authoring users do.

Furthermore, user 122 included torque and drag chart maker user-designed module 1130 in user-designed context 1100. As its inputs, user 122 declared an input for computed rig condition report 1128 and measured depth-clean 1122. Using these inputs, torque and drag maker user-designed module 1130 is therefore designed to generate (as an output) torque and drag chart 1114 thereby providing the desired functionality of user-designed context 1100.

Module authoring user 122, though, might or might not have ensured for the proper ordering of the various instances of user-designed modules 1115, 1126, and 1130. In systems heretofore available, the failure of user 122 to ensure proper ordering of these modules would likely be fatal, problematic, or (at least) frustrating to users 122. Moreover, without clean data, data homogeneity and heterogeneity issues might also have caused user 122 considerable frustration. Processing systems 236 of the current embodiment at least partially relieve module authoring users 122 from burdens associated with these issues.

More particularly, processing system 236 of some embodiments examines the input, output, etc. declarations of modules 1115, 1126, and 1130 and, considering the associated context(s) determines which pieces of drilling data 1104, 1106, 1108, 1110, 1112, 1116, 1118, 1120, 1122, 1124, and 1128 are inputs and which are outputs (and for which user-designed modules 1115, 1126, and 1130). For each input, processing system 236 searches for user-designed modules 238 outputting the same drilling data 1114 or 1116 (or other sources of the same). Each time processing system 236 identifies a process (be it a user-designed module 238 or some other source) it orders the execution of that process and its dependent user-designed module 238 accordingly. For instance, in the current embodiment, processing system 236 determines that torque and drag user-designed maker module 1130 is designed to accept computed rig condition report 1128 as an input while rig-condition detection user-designed module 1126 outputs the same. Thus, processing system 236 orders the execution of torque and drag chart maker user-designed module 1130 after rig-condition detection user-designed module 1126.

After analyzing the set of declarations of the various module instances 1115A-E, 1126, and 1130, in system 100, processing system 236 of the current embodiment orchestrates their operation so that the instances of clean data module 1115A-C can operate in parallel but before (the applicable instance of) rig-condition detection user-designed module 1126. Similarly, processing system 236 schedules clean data module instance 1115D before that instance of torque and drag chart maker user-designed module 1130 so that in-context measured depth-clean becomes available prior to execution of that in-context instance of torque and drag chart maker user-designed module 1130. Thus, FIG. 11 illustrates that processing system 236 of the current embodiment schedules a mixture of potentially parallel and serial instance executions which are derived from the declarations of the various user-designed modules 1115, 1126, and 1130 involved in user-designed context 1100 (and elsewhere in system 100 if desired). After creating the declarations of such user-designed modules 1115, 1126, and 1130 and specifying the corresponding contexts, user 122 did not have to take action to ensure that user-designed modules 1115, 1126, and 1130 (or rather instances thereof) would execute in such a way as to produce repeatable and reliable results: here torque and drag chart 1114. Thus, processing system 236 of embodiments allows users 122 to design multi-purpose modules without having to concern themselves with scheduling the same in most cases.

In the alternative, or in addition, processing system 236 could be configured such that all user-designed modules 238 execute periodically and that user-designed modules 238 rely on input/output files 240 (see FIG. 1) for their inputs and outputs. In those situations in which one user-designed module 238 depends on another user-designed module 238 to produce one of its inputs, processing system 236 identifies such dependencies and routes the pertinent output to the input/output file 240 of the dependent user-designed module 238. Thus, upon beginning an execution, the dependent user-designed module 238 checks its input/output file for pertinent changes. If it finds no differences in its input/output file 240 from when it last executed, user-designed module can return to a dormant state. If, it finds a pertinent change, user-designed module 238 can execute accordingly. Moreover, while FIG. 11 only shows certain pieces of drilling data 114 and 116 and other resources, generally, user-designed contexts 1100 will include potentially numerous resources associated with some drilling structure such as a particular wellbore 112.

FIG. 11 also illustrates that user-designed context 110 was set up such that the inputs of one module and the outputs of another happen to be separated by an intermediate dataset (the cleaned versions of the drilling data 114 and 116 in the current embodiment). However, embodiments do allow direct piping of outputs from one module to the inputs of another module.

Figure 12:
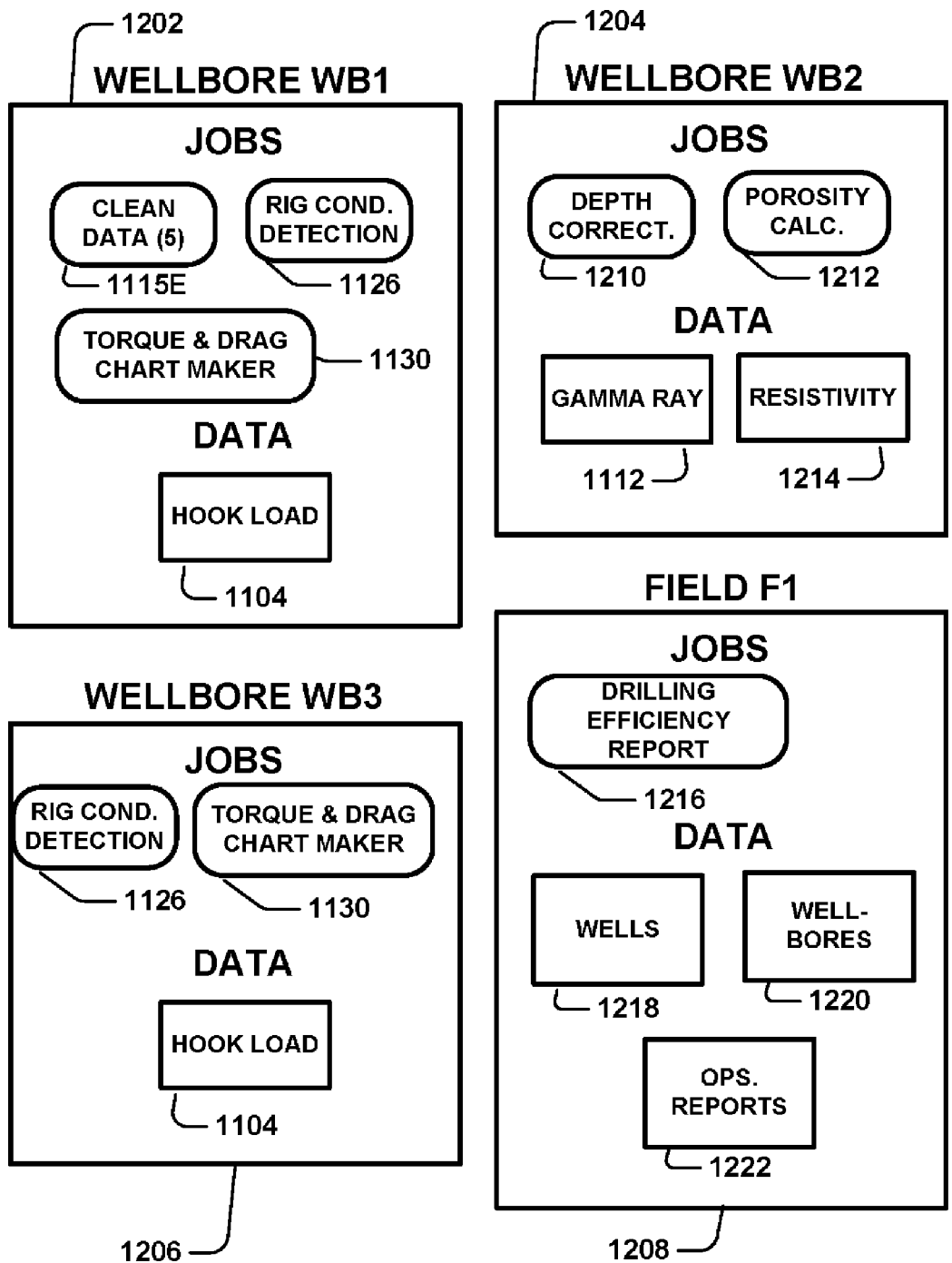
FIG. 12 illustrates aspects of several user-designed contexts.

FIG. 12 illustrates aspects of several particular user-designed contexts. More specifically, FIG. 12 illustrates that context authoring users 122 can include various pieces of drilling data 114 and 116 and various user-designed modules 238 (or instances thereof) in user-designed contexts 1202, 1204, 1206, and 1208. Thus, it is possible to include in a user-designed context only some of the contents of a particular object and not others. Of course, in the alternative or in addition, context building users 122 can include whole objects (including all of its contents) corresponding to a particular drilling structure (for instance, a wellbore 112) in a user-designed context. More particularly, processing system 236 does not typically impose any a priori constraints on the design of user-designed contexts 1202, 1204, 1206, and 1208. Users 122 can place therein any objects, drilling data 114 and/or 116, resources, extra-contextual data, etc. which they feel might be appropriate. Of course, some embodiments provide for processing system 236 imposing one-to-one correspondence between drilling structure related objects and user-designed contexts. Thus, for user-designed context 1202, user 122 included therein jobs corresponding to clean data module 1115 (five jobs), a job corresponding to rig condition detection user-designed module 1126, and a job corresponding to torque and drag chart maker user-designed module 1130. Additionally, via the declarations of the modules, user 122 included various pieces of drilling data including hook load 1104 and 1116. Perhaps notably, user 122 did so without being required by the processing system 236 of the current embodiment to consider or adhere to restrictions associated with hierarchical and/or framework-based approaches With continuing reference to FIG. 12, user 122 designed this particular user-designed context 1204 to include jobs 1210 and 1212 corresponding to a depth correction module and a porosity calculator module. In-context gamma ray and resistivity pieces of drilling data 1112 and 1214 also appear in user-designed context 1204. Likewise, user defined context 1206 includes jobs corresponding to rig-condition detector user-designed module 1126 and torque and drag chart maker user-designed module 1130 and drilling data 114 and 116 including hook load 1104 and, perhaps, other drilling data 114 and 116. User-designed context 1208 includes a job 1216 corresponding to a drilling efficiency report module and drilling data 114 and 116 including a wells report 1218, a wellbores report 1220 (for the wellbores in the wells listed in the wells report), and various operations reports 1222 for the wellbores.

Accordingly, FIG. 12 illustrates that systems of the current embodiment allow users 122 to design user-designed contexts with the jobs, inputs, output, resources, etc. which users 122 believe will process drilling data 114 and 116 as desired. Moreover, processing system 236 of the current embodiment imposes no limitations on such choices made by users 122. However, processing system 236 will enforce those user defined contexts as designed by users 122 while also reducing or eliminating the effects of data homogeneity, data heterogeneity, etc.

Embodiments provide systems and methods for processing drilling data which might exhibit issues related to both data homogeneity and heterogeneity and/or scheduling issues peculiar to drilling structures. Systems of embodiments can build user-designed contexts and/or user-designed modules according to embodiments disclosed herein. Systems of embodiments orchestrate the execution of data processing processes within the contexts and also connect in-context and extra-contextual drilling data to the processes as indicated by declarations of the modules. Thus, users of the systems (and methods) provided herein avoid much, or all, of the cumbersome, error-prone, and inefficient single purpose and/or point-to-point configuration of previously available systems. Embodiments also allow users with context building privileges to set the scope for user-designed modules authored by other users (with module authoring privileges). These author modules are free therefore to access drilling data and other resources within the scope of the contexts within which their modules execute. Other users (without such privileges) are restricted to viewing the results of the in-scope execution of the user-designed modules. Moreover, while the foregoing used drilling data and drilling structures to illustrate aspects of various embodiments, such data processing systems, methods, etc. could be used to process other types of data without departing from the scope of the disclosure.

CONCLUSION

Although the subject matter has been disclosed in language specific to structural features and/or methodological acts, it is to be understood that the subject matter defined in the appended claims is not necessarily limited to the specific features or acts disclosed above. Rather, the specific features and acts described herein are disclosed as illustrative implementations of the claims.

The invention claimed is:

1. A system for processing drilling related data, the system comprising:
   a network interface;
   a processor in communication with the interface;
   the processor being configured to build built-in contexts which approximate contexts corresponding directly to drilling structures, the built-in contexts for processing drilling data;
   the processor being further configured to orchestrate execution of instances of drilling data processing modules within the built-in contexts; and
   the processor being further configured to:
      provide a first drilling data from a built-in context to a module instance via the interface,
      accept a second drilling data from the module instance via the interface,
      provide an in-context application program interface and an extra contextual application program interface to the modules, and
      enforce the built-in contexts.

2. A system for processing drilling related data, the system comprising:
   a network interface;
   a processor in communication with the interface;
   the processor being configured to build user-designed contexts for processing drilling data;
   the processor being further configured to orchestrate execution of drilling data processing modules within the user-designed contexts; and
   the processor being further configured to provide a first drilling data from a user-designed context to a module via the interface and to accept a second drilling data from the module via the interface.

3. The system of claim 2 wherein the user-designed context approximately corresponds to a drilling structure.

4. The system of claim 2 wherein the processor is further configured to orchestrate the execution of the modules responsive to a declaration of a module associated with generating the first drilling data.

5. The system of claim 2 wherein the first drilling data further comprises both numeric data and descriptive data.

6. The system of claim 2 wherein the processor is further configured to provide an extra contextual application program interface to the modules.

7. The system of claim 2 wherein the processor is further configured to enforce the user-designed contexts.

8. The system of claim 2 wherein the module executes in the user-designed context and operates on the first drilling data to produce the second drilling data.

9. The system of claim 2 wherein the processor is further configured to monitor the first drilling data to detect an event and to orchestrate the execution of the modules responsive to detecting the event.

10. The system of claim 2 further comprising a point-to-point communication path between two of the drilling structures.

11. The system of claim 2 wherein the second drilling data is an event fired by the module.

12. The system of claim 2 further comprising a web server in which the processor is located, the interface being to a network wherein the orchestration of the execution of modules within the user-designed contexts is exposed as a service to the modules residing on the network.

13. A method for processing drilling related data, the method comprising:
   building user-designed contexts for processing drilling data using a processor;
   orchestrating execution of drilling data processing modules within the user-designed contexts using the processor; and
   providing a first drilling data from a user-designed context to a module and accepting a second drilling data from the user-designed module via a network interface using the processor.

14. The method of claim 13 wherein the user-designed context approximately corresponds to a drilling structure.

15. The method of claim 13 wherein the orchestration of the execution of the modules is responsive to a declaration of a module associated with generating the first drilling data.

16. The method of claim 13 wherein the first drilling data further comprises both numeric data and descriptive data.

17. The method of claim 13 further comprising providing an extra contextual application program interface to the modules using the processor.

18. The method of claim 13 further comprising enforcing the user-designed contexts using the processor.

19. The method of claim 13 wherein the module executes in the user-designed context and operates on the first drilling data to produce the second drilling data.

20. The method of claim 13 further comprising monitoring the first drilling data to detect an event and orchestrate the execution of the modules responsive to detecting the event.

* * * * *